Oct. 14, 1958 J. W. GRAY ET AL 2,856,519

AUTOMATIC SIGNAL FREQUENCY TRACKER, WITH SEARCH AND HOLD-DURING-FADE PROVISIONS

Filed Oct. 11, 1952 6 Sheets-Sheet 1

INVENTOR.
JOHN W. GRAY
EARL G. NEWSOM
ROBERT CRANE, Jr.

BY

H. L. Mackey

ATTORNEY.

Oct. 14, 1958 J. W. GRAY ET AL 2,856,519

AUTOMATIC SIGNAL FREQUENCY TRACKER, WITH SEARCH AND HOLD-DURING-FADE PROVISIONS

Filed Oct. 11, 1952 6 Sheets-Sheet 2

INVENTORS.
JOHN W. GRAY
EARL G. NEWSOM
ROBERT CRANE, JR.

BY

ATTORNEY.

Oct. 14, 1958 J. W. GRAY ET AL 2,856,519

AUTOMATIC SIGNAL FREQUENCY TRACKER, WITH SEARCH AND HOLD-DURING-FADE PROVISIONS

Filed Oct. 11, 1952 6 Sheets-Sheet 3

INVENTORS.
JOHN W. GRAY
EARL G. NEWSOM
ROBERT CRANE, JR.

BY H. A. Mackey

ATTORNEY.

Oct. 14, 1958 J. W. GRAY ET AL 2,856,519

AUTOMATIC SIGNAL FREQUENCY TRACKER, WITH SEARCH AND HOLD-DURING-FADE PROVISIONS

Filed Oct. 11, 1952 6 Sheets-Sheet 4

INVENTOR.
JOHN W. GRAY
EARL G. NEWSOM
ROBERT CRANE, JR.

BY

H. L. Mackey

ATTORNEY

Oct. 14, 1958 J. W. GRAY ET AL 2,856,519

AUTOMATIC SIGNAL FREQUENCY TRACKER, WITH SEARCH AND HOLD-DURING-FADE PROVISIONS

Filed Oct. 11, 1952 6 Sheets-Sheet 5

Inventor
JOHN W. GRAY
EARL G. NEWSOM
ROBERT CRANE, JR.

By [signature]
Attorney

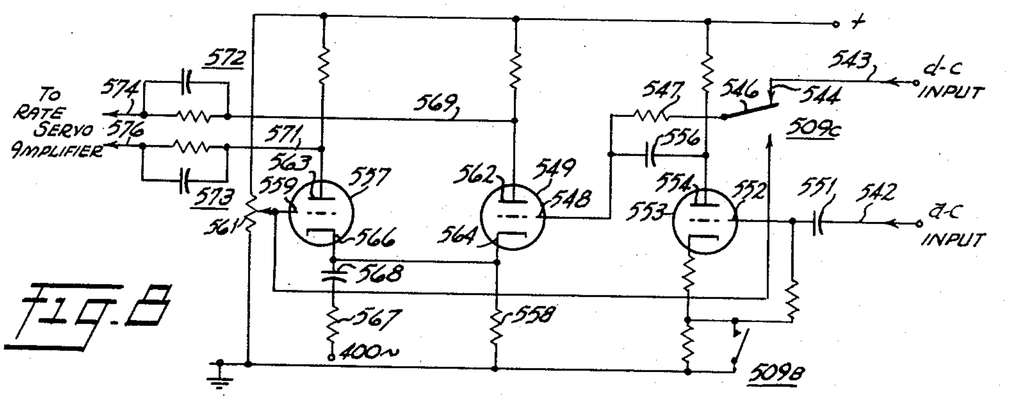
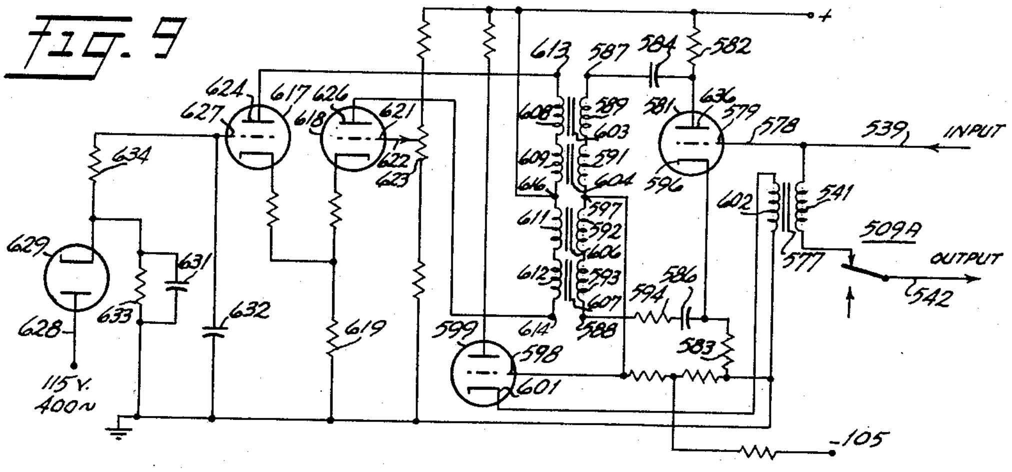
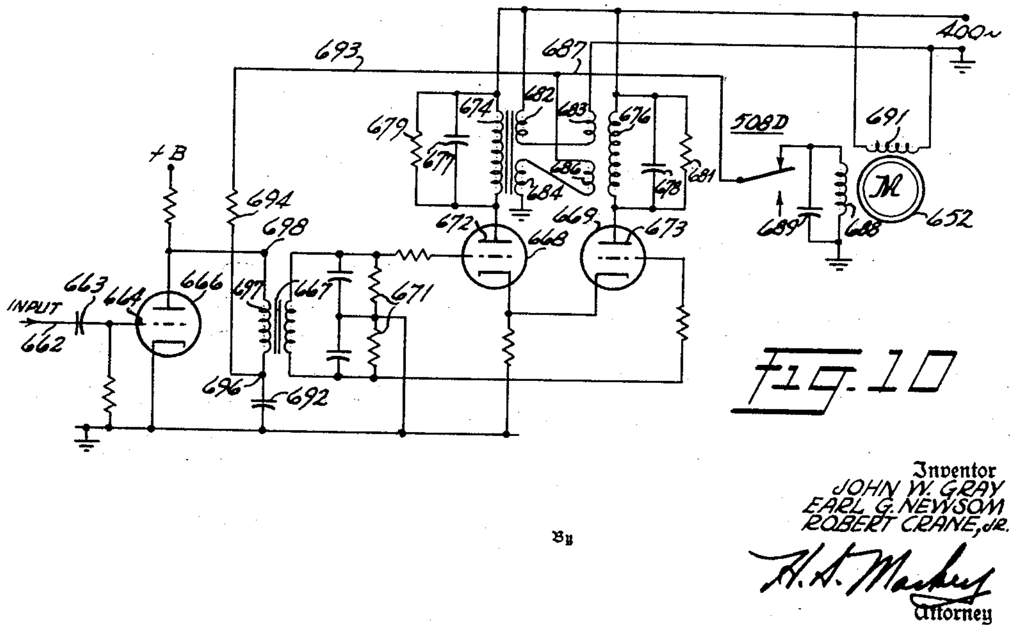
Inventor
JOHN W. GRAY
EARL G. NEWSOM
ROBERT CRANE, JR.
By H. A. Mackey
Attorney United States Patent Office 2,856,519

Patented Oct. 14, 1958

2,856,519

AUTOMATIC SIGNAL FREQUENCY TRACKER, WITH SEARCH AND HOLD-DURING-FADE PROVISIONS

John W. Gray, White Plains, Earl G. Newsom, Thornwood, and Robert Crane, Jr., Chappaqua, N. Y., assignors to General Precision Laboratory Incorporated, a corporation of New York Application October 11, 1952, Serial No. 314,306

17 Claims. (Cl. 250—20)

Figure 1:
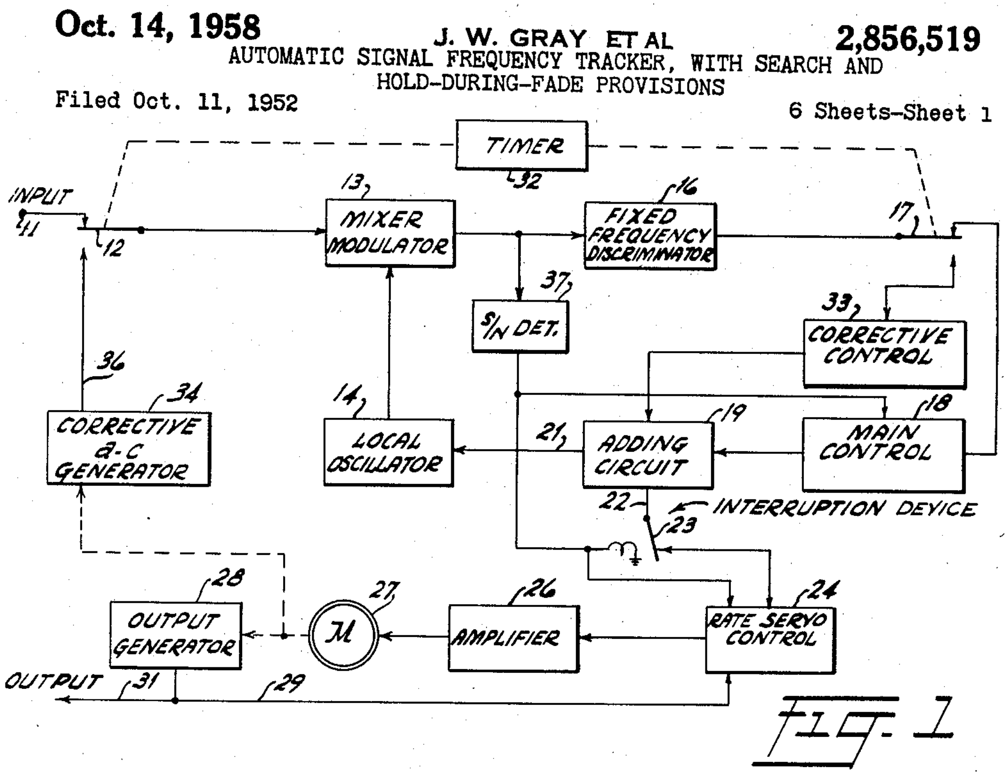

This invention relates to an automatic electrical signal frequency tracker and more specifically to an instrument for locking to and tracking with the varying central frequency of an input signal voltage having a relatively wide frequency bandwidth, the instrument emitting output data representative of that central frequency.

The usefulness of this invention in general lies in providing a frequency tracker of high sensitivity combined with high accuracy for locking the output of electrical equipment to an incoming signal which varies in any manner throughout a frequency range, and which is mixed with a high proportion of "noise" or interfering signals of random frequency and voltage distribution.

In so locking the output signal to the input signal, the automatic signal frequency tracker accurately measures the center of power of the wide-band input signal. The input signal may consist, for instance, of a constant voltage complex wave composed of a noise spectrum having constant power per unit bandwidth between the maximum and minimum frequency limits to which the tracker is responsive, and a narrower useful spectrum therein having a bandwidth of about 10% of its center frequency. The center of the useful spectrum may be of any frequency between the above maximum and minimum limits, nevertheless the automatic signal frequency tracker is required to measure the frequency of the spectrum with an error of less than 0.1% of the center frequency with a minimum time delay and in the presence of relatively great noise interference represented by a low signal-to-noise ratio at the center frequency.

Such accuracy precludes the employment of conventional automatic frequency control techniques as does the possibility that the input signal may spontaneously shift its spectrum central frequency over a range having a ratio between maximum and minimum frequencies that may be for instance as great as 20 to 1. The instant invention therefore employs techniques and apparatus that are qualitatively different from those of the automatic frequency control art.

A specific use for the automatic signal frequency tracker is in connection with the radar art, in which the echo return may vary in an unpredictable and highly erratic manner, but in which the echo return must be utilized continuously, it being impossible for the conventional automatic frequency control to track such a signal.

The automatic signal frequency tracker of the instant invention operates by segregating the useful input signal from the greater part of the accompanying noise signal, then defining the central part of the broad spectrum or band comprising the useful input signal. Since the useful signal may be and usually is moving in frequency and varying in relative voltage intensity throughout the spectrum, the operation of defining the central part or frequency of the broad frequency spectrum includes an integrating operation so that the central frequency is the spectrum power average in the time sense as well as in the frequency sense. This central frequency is continuously stored in a stand-by memory component so that in the event of failure of the input signal, an output signal is continued for an indefinitely long time. A search function is also included which automatically starts upon failure of the input signal or upon an abrupt change of its frequency, and which continuously searches the entire possible range of input signal frequencies until a usable signal is again picked up, when the signal tracker is again locked to the input signal and the search is discontinued. The output signal may, of course, be in the form of any physical quantity and there may be several different forms of output signal produced simultaneously. For example, the output signals may consist of a voltage magnitude and the speed of rotation of a shaft, each proportional to input frequency.

The general object of this invention is then to provide an instrument that is receptive to electrical signals of random and changing magnitude and frequency within a shifting frequency spectrum, that locks to the spectrum and follows its shifts, that measures and selects the central frequency of the spectrum, and that emits output data representative of that central frequency.

A more specific object is to provide an instrument suitable for use in connection with radar equipment that generates as output data a modulation frequency potential derived from a radar echo which may include a high proportion of noise voltages, the input signal being of the nature of a voltage having a shifting band of frequencies while at the same time the amplitudes of voltages at the several frequencies within the band are random in distribution and change fortuitously and rapidly.

Other and further objects will be readily apparent from the following description when taken in consideration with the accompanying drawings in which:

Figure 1 is a block diagram illustrating the general arrangement of apparatus of this invention.

Figure 2A:
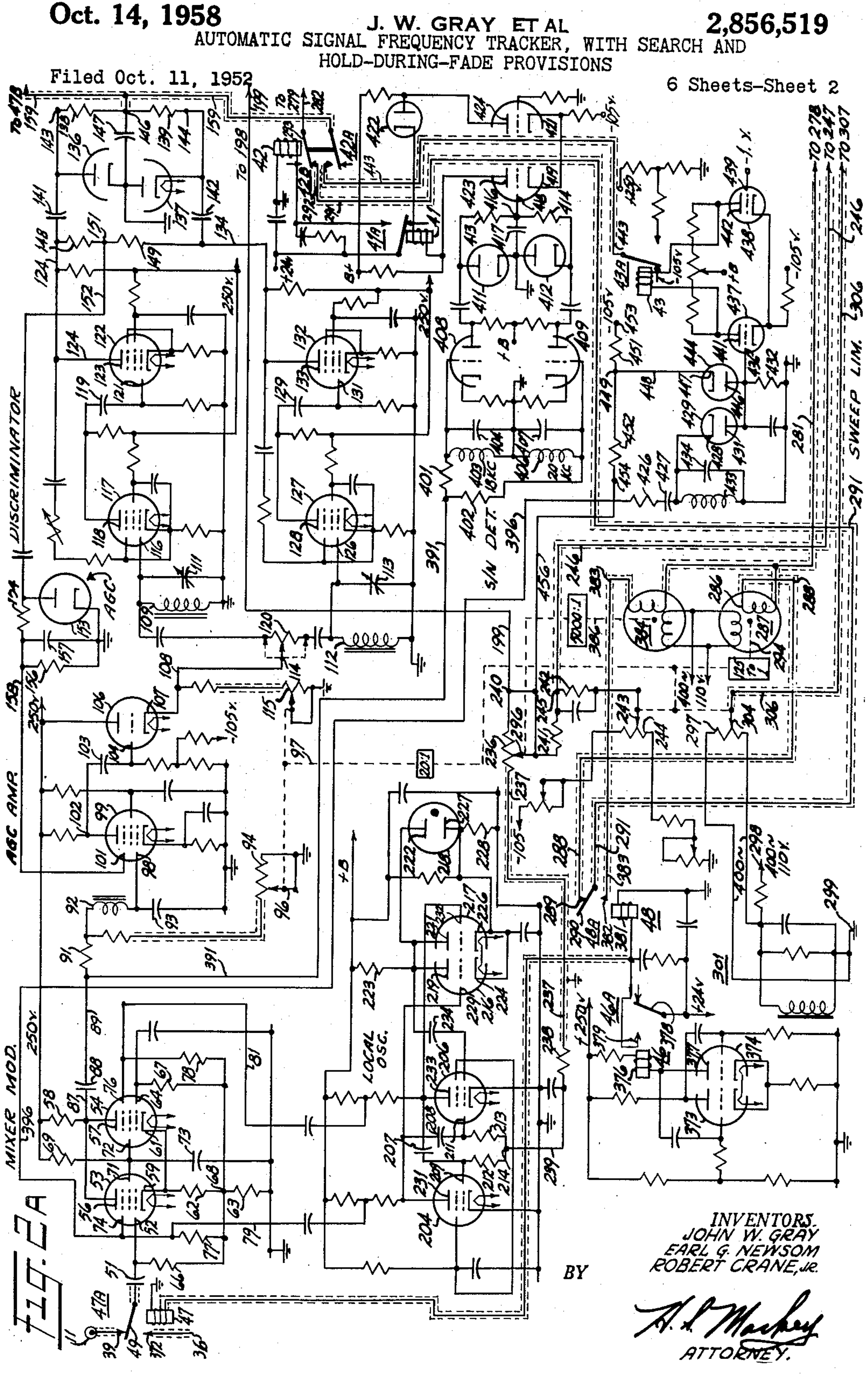
Figure 2B:
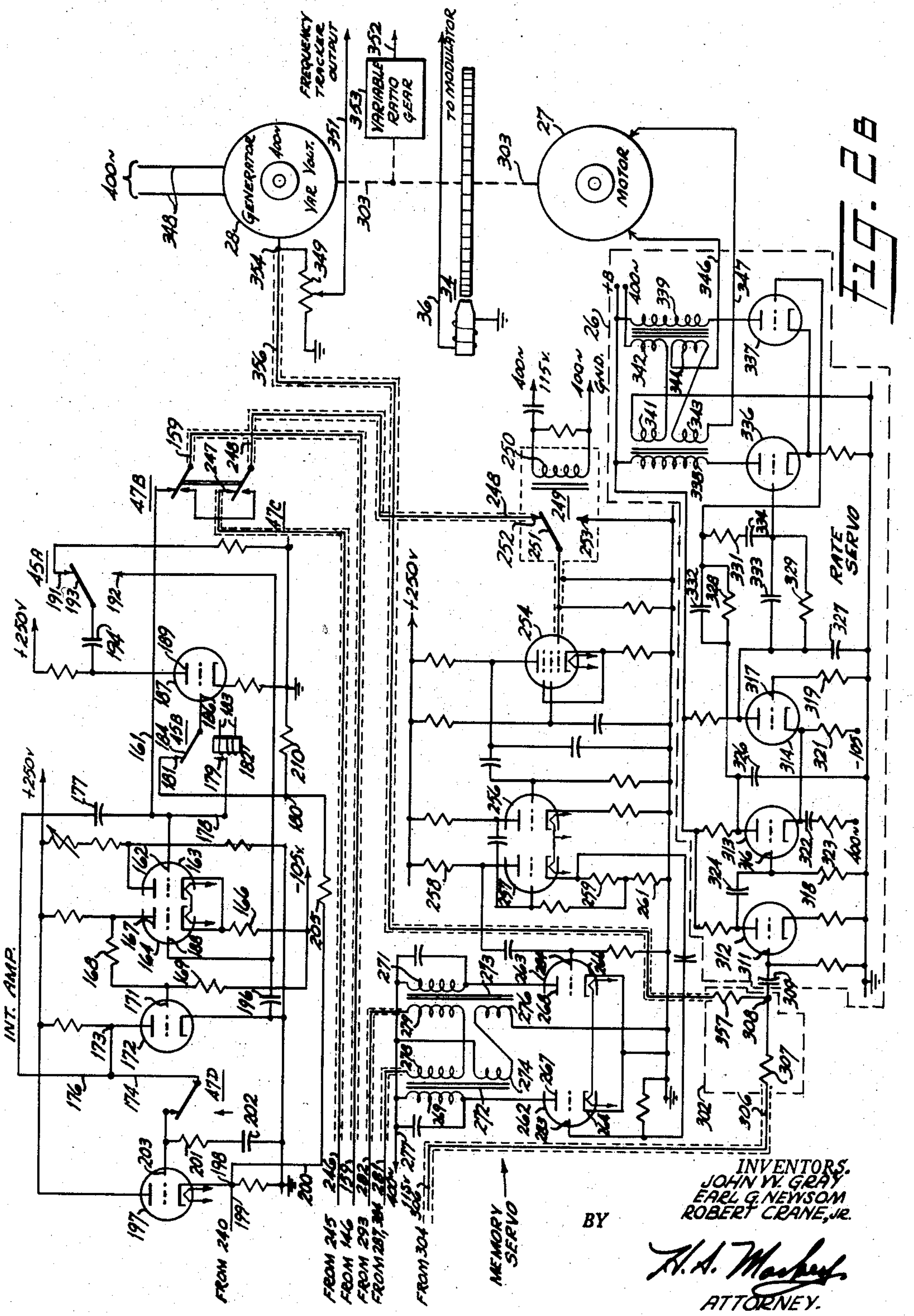

Figures 2A and 2B taken together schematically illustrate one specific embodiment, those conductors that lead from one figure to the other being numbered alike.

Figure 3:
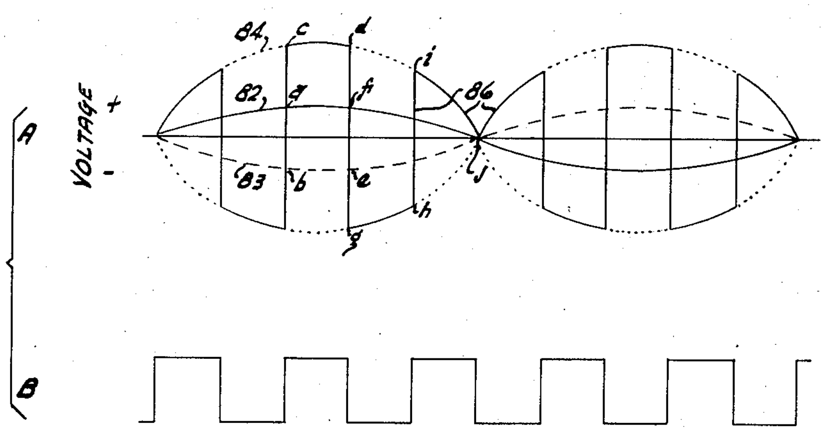

Figure 3 graphically depicts the operation of the mixer-modulation component of the invention.

Figure 4:
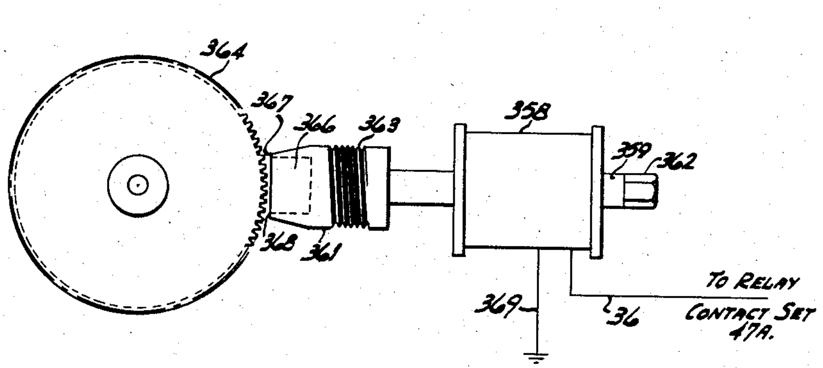

Figure 4 is a schematic drawing of a tone generator used in connection with the invention.

Figure 5:
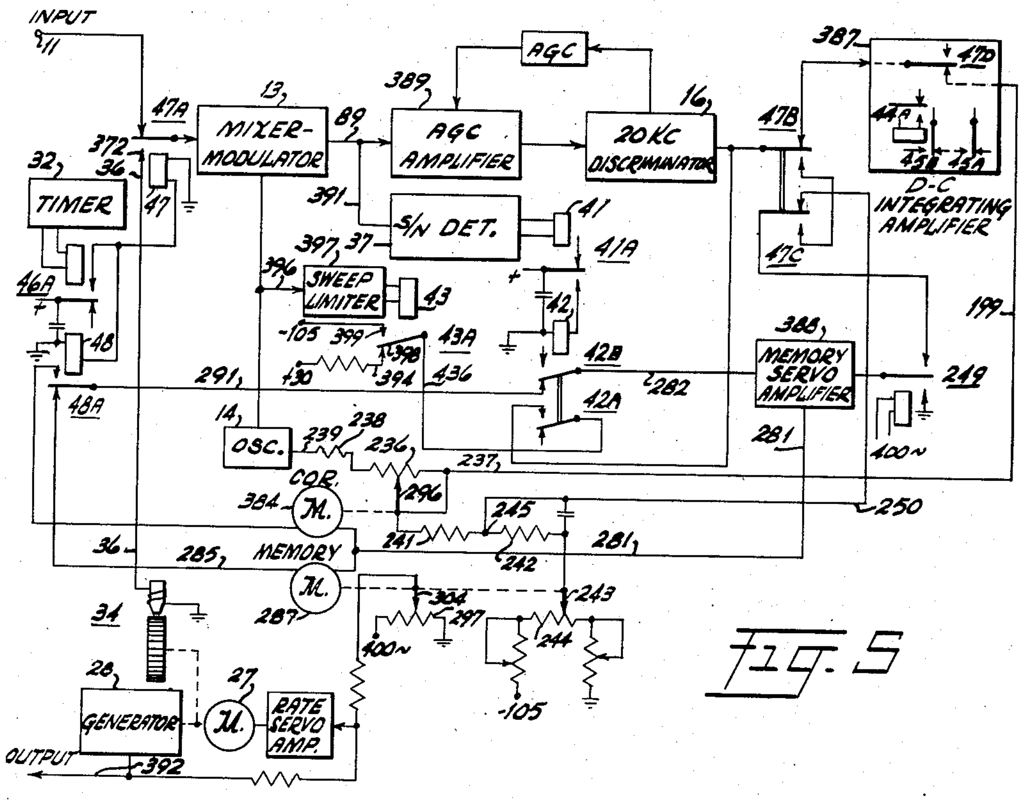

Figure 5 schematically depicts the relay circuit of one embodiment of the invention.

Figure 6:
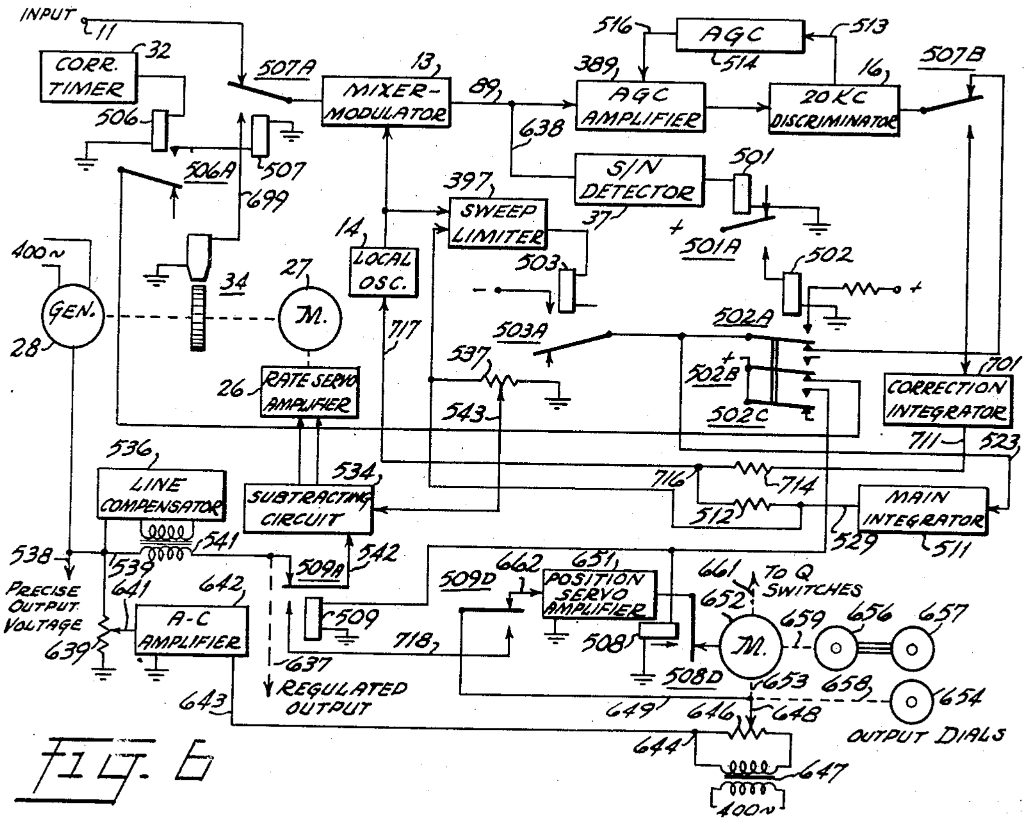

Figure 6 schematically depicts the relay circuit of a second embodiment of the invention.

Figure 7:
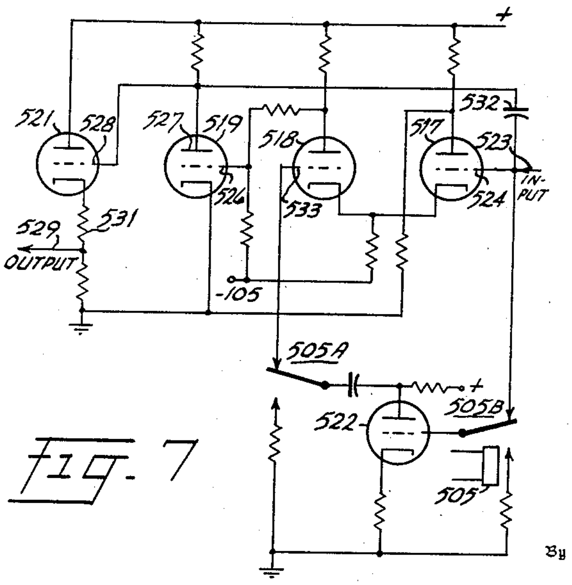

Figure 7 schematically depicts an integrator used in connection with the invention.

Figure 8 schematically depicts a subtraction circuit used in connection with the invention.

Figure 9 schematically depicts a line compensator used in connection with the invention.

Figure 10 schematically depicts a position servo amplifier used in connection with the invention.

Figure 11:
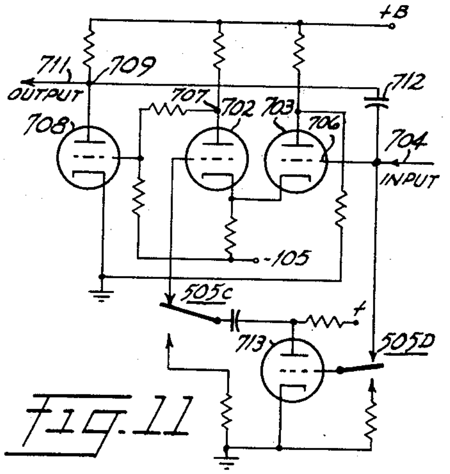

Figure 11 schematically depicts a correction integrator used in connection with the invention.

The automatic signal frequency tracker of the instant invention is particularly designed for operation by and utilization of an input signal which varies over a range of frequency and which consists of a spectrum or band of frequencies rather than a single sharply defined frequency and which may include an admixture of considerable noise.

Signals of this type are obtained in systems wherein the Doppler principle is utilized to measure the speed of a moving object. In such systems it has been proposed to transmit a beam of electromagnetic energy from one object to another and to receive the reflected echoes on the first object comparing them in frequency with the frequency of the original transmitted signal to obtain the difference or Doppler frequency D which constitutes a measure of the relative speed of the two objects in accordance with the equation $$D=\frac{2fv}{C} \qquad (1)$$

wherein $f$ is the frequency of the transmitted signal, $v$ the relative speed between the objects, and C the velocity of propagation of the electromagnetic waves, i. e., the speed of light.

When systems of this type are used to determine the speed of an airborne vehicle with respect to the earth's surface the transmitted signal must be directed downwardly towards the earth's surface at an angle as respects the velocity vector of the vehicle and hence the expression of Equation 1 must be modified to take into account this noncoincidence between the velocity vector and the direction of propagation and return of reflected echo resulting in the equation $$D=\frac{2fv}{C}\cos\theta \qquad (2)$$

where $f$, $v$, and C have the values set forth above and $\theta$ is the angle between the velocity vector of the vehicle and the direction of propagation and return of the reflected energy. In such circumstances the Doppler frequency signal is not a single or monochromatic frequency but rather is a spectrum or band of frequencies having a maximum amplitude at its central portion and decreasing more or less gradually at frequencies above and below this central portion. This characteristic arises mainly by reason of the fact that the beam of energy transmitted and received by the airborne vehicle necessarily has a finite width and therefore a considerable area of the earth acts as a reflecting surface. The angle $\theta$, however, is different for various points in this area so that different elemental areas reflect signals of different frequencies.

Since the Doppler frequency is directly proportional to the airplane's speed, a range of speed from that of landing or takeoff to that of the highest airplane speed may result by calculation from Equation 2 in a range of Doppler frequencies from 1 kilocycle to 16 kilocycles. Theory has predicted and experiment has demonstrated that the frequency width of the Doppler frequency spectrum or signal is about ten percent of its central frequency. That is, if the central frequency is 10,000 cycles, the spectrum extends from about 9500 cycles to 10,500 cycles. Because of the varying nature of the reflector, the earth's surface, the instantaneous voltages vary in a random way throughout this 1000-cycle frequency spectrum, and also at each specific frequency within this spectrum the voltage varies from instant to instant in a random manner.

Thermal electrical disturbances, mostly originating within the radar receiver, and other interfering voltages all classed together as electrical "noise," tend to mask the signal and to interfere with the operation of the frequency tracker. Therefore the instant invention contains provision for eliminating the interference of all noise except that having frequencies within the input signal spectrum, so that the frequency tracker is energized and functions with input signals having a relation of useful signal to total noise signal over the entire input range as low as −16 db. The component of the invention having the function of detecting the magnitude of this ratio is termed the signal-to-noise ratio detector. It is particularly useful when, in the use of the frequency tracker in conjunction with airborne radar, the aircraft passes over water and a powerful echo from land is replaced by a weak echo from water.

The output of the automatic signal frequency tracker must faithfully represent at all times that frequency magnitude representing the time and frequency average of the input signal spectrum. The form of representation may be whatever is desired depending on the specific application to which it is to be put, for example, any electrical or mechanical magnitude may be made the analogue of the input central frequency, and if desired the output data may be presented simultaneously and continuously in more than one form. For the purpose of example and as an aid in understanding the operation of the invention this output data will be described as taking the form of an alternating current voltage having a constant frequency of 400 cycles per second and a voltage magnitude proportional to the input central frequency, and a shaft rotation having a speed proportional to the input central frequency.

Referring now to Fig. 1, an input signal, which may be of the nature of that described above, is applied to an input terminal 11, passes through the normally closed contacts of a relay 12, and energizes a mixer-modulator 13. Here the signal is modulated by a signal derived from an adjustable local oscillator 14 and the beat frequency or difference signal is applied to a fixed frequency discriminator 16. The output of this frequency discriminator passes through the normally closed contacts of a second relay 17 to a main control circuit 18, the nature of which will be described later in detail, and passes through an adding circuit 19 to the local oscillator 14, completing a circuit or loop that operates as a servo system. The difference frequency applied to the discriminator 16, if slightly different from its central tuned frequency, results in an error signal which passes through the main control means 18 to the local oscillator and changes its frequency of oscillation in such direction as to bring the difference signal to the central tuned frequency of the discriminator 16. When this has occurred the discriminator output or error signal falls to substantially zero and the local oscillator frequency is no longer modified but is held at the value at which it was last set by the main control means 18. This servo system circuit is termed the discriminator loop and its function is to impress on conductors 21 and 22, electrical quantity magnitudes representative of a time average of the central frequency of the input spectrum.

The conductor 21 conveys a control signal to the local oscillator as described, the other conductor 22 conveys a similar control signal through an interruption device 23, such as a relay, to a rate servomechanism comprising a control 24, amplifier 26, motor 27, and output generator 28. A feedback conductor 29 from the output generator 28 to the control 24 completes the loop, and the frequency tracker output is a voltage taken from the output generator 28 through conductor 31.

If it were possible to employ an electrical or mechanical magnitude taken directly from the discriminator loop as the instrument output the error therein would be limited to that inherent in the discriminator loop, and the error could be made very low. But since the required type of output signal cannot be secured directly from the discriminator feedback signal conductor, it must be taken from a separate output generator. Under ideal conditions the output generator 28 will generate a constant frequency output signal whose voltage amplitude at all times is an exact measure of the central frequency of the input signal. In the arrangement necessarily used, however, certain errors are likely to be introduced particularly by reason of the fact that it is impossible to construct a local oscillator such as 14 and the servomechanism and output generator circuit to have exactly the same ratio of output to input over the entire range of operation of the apparatus, since the calibration curves of any two electronic instruments can almost never be made to coincide over the full range of both instruments.

To insure accurate correspondence between the amplitude of the output signal generator and the central frequency of the input signal, and hence the overall accuracy of the system, a substitution method of correction is employed wherein periodically and for short intervals of time the system is switched so that a signal whose frequency exactly corresponds to the amplitude of the output signal of the generator 28 is substituted for the input signal and correction factors are introduced if at the time of switch over the amplitude of the output signal of the generator 28 has for any reason departed from correspondence with the central frequency of the input signal.

This periodic alteration in the circuit connections of the system is accomplished through the medium of a timer 32 which acts on relay armatures 12 and 17 to cause them to engage their associated contacts opposite from the position of engagement illustrated in Fig. 1. When armature 12 is operated to its lowermost position the circuit connecting the input terminal 11 to the mixer-modulator 13 is interrupted and the output of a corrective alternating current generator 34 is imposed on the mixer-modulator 13 through the conductor 36 and armature 12. The corrective generator 34 is operated from the same shaft of the motor 27 which operates the output generator 28 and the corrective generator produces a signal whose frequency depends on the speed of rotation of the shaft in contra-distinction to the output generator 28 which produces a signal of constant frequency but of an amplitude which is proportional to the speed of rotation of the motor shaft. Thus the output signal frequency of the corrective generator 34 directly and accurately corresponds to the amplitude of the output signal generated by the output generator 28 since both are dependent on the same shaft rotation.

At the same time that the input of the mixer-modulator 13 is switched as just described, the relay armature 17 is caused to engage its lowermost contact so that the main control circuit 18 is disconnected from the output of the discriminator 16 and a corrective control circuit 33 is substituted in place thereof. The corrective control circuit operates to introduce a corrective factor to the adding circuit in a manner more fully set forth hereinafter which in turn acts through the rate servo control 24 and its associated servo loop to control the speed of the motor 27 and therefore the amplitude of the output signal of the output generator 28 and the frequency of the output signal of the corrective generator 34.

In considering the operation of the circuit as thus far described let it be supposed that the relay armatures 12 and 17 are first in their uppermost positions and that operation has reached stable conditions so that the central frequency of the input signal beating with the signal produced by the local oscillator 14 in the mixer-modulator 13 produces a difference beat frequency signal corresponding to the central frequency of the frequency discriminator 16. Under such conditions no output signal is obtained from the frequency discriminator 16 to operate the main control circuit 18 and the conditions of the adding circuit 19 are not changed so that the local oscillator continues to generate signals at the frequency to which it was last adjusted. At the same time the signal derived from the adding circuit and impressed on the rate servo control circuit 24 causes the motor 27 to operate at a definite speed depending on the value of this signal. The motor 27 actuating both the output generator 28 and the corrective generator 34 causes the generation of a signal by the output generator whose amplitude is fixed in accordance with the speed of the motor and the generation of a signal by the corrective generator 34 the frequency of which is fixed in accordance with the motor speed.

If the calibration of all of these circuit elements were exactly the same the frequency of the corrective generator 34 would be exactly that of the center frequency of the input signal and the amplitude of the output generator signal would bear an exact and accurate relation to the input signal center frequency.

Suppose, however, that due to unavoidable departure in input-output characteristics between the local oscillator 14 and the rate servo loop, the signal frequency of the corrective generator 34 departs by a slight amount from the central frequency of the input signal and hence as a concomitant the amplitude of the signal generated by the output generator 28 does not bear its true and accurate relationship with the central frequency of the input signal. Assume, further that this error having occurred the relay armatures 12 and 17 are switched to their alternate positions by the timer 32. At this time the output signal of the corrective generator 34 is substituted for the input signal but since under our assumptions the signal frequency of the generator 34 is not exactly the same as the central frequency of the input signal and the local oscillator 14 frequency has not changed, there will be produced by the mixer-modulator 13 a new beat frequency which departs slightly from that heretofore produced and which consequently does not coincide with the central frequency of the fixed frequency discriminator 16. Under these conditions an output signal is produced by the discriminator 16 which is impressed on the corrective control circuit 33, since the armature 17 is now in its lowermost position. This signal results in operation of the corrective control means which in turn alters the adding circuit 19 so that the output thereof when impressed on the rate servo 24 is varied in a direction to produce a new motor speed of such value as corrected the operation of both the generators 28 and 34.

The errors caused by noncoincidence of said calibration over their entire range of the various circuit elements as well as such other errors as may occur are small and accumulate relatively slowly so that a relatively short period of operation of the correction circuits at fairly wide intervals is sufficient to provide extremely accurate operation of the entire system.

A signal-to-noise detector 37 is energized from the mixer-modulator 13 output, so that, in the event that the useful signal falls below a selected level relative to noise, relays are operated to discontinue the time substitution correction. The main control circuit 18 is also modified to cause the local oscillator to sweep and search slowly and repeatedly over the entire range of possible input signal frequencies from the highest frequency to the lowest. If during this search a usable signal is encountered the signal-to-noise ratio detector detects it and causes the main control circuit to revert to its normal function. When the signal-to-noise ratio detector operates it also interrupts the circuit to the rate servomechanism and modifies the internal circuit thereof so that it maintains its then rate until the control connection is restored. During the period of interruption, the output generator therefore continues to emit the output signal that it was emitting at the instant of interruption. This maintenance of output signal during interruption of control is analogous to human memory, and since it is inherently unlimited in time it can be characterized as infinite memory.

*Mixer-modulator*

The detailed schematic circuit diagram is illustrated in Figs. 2A and 2B when taken together. In these figures the input signal is applied to terminal 11 and is conducted through the normal fixed contact 39 and armature 49 of one set of relay contacts 47A and a coupling condenser 51 to a control grid 52 of the mixer-modulator component. The mixer-modulator comprises two pentodes 53 and 54. Their plates 56 and 57 are connected together and to a common plate resistor 58 leading to a source of positive voltage while cathodes 59 and 61 are connected together and through series resistors 62 and 63 to ground. The control grids 52 and 64 are returned through equal resistors 66 and 67 to a junction point 68 on the common cathode resistors such as to bias the grids for operation in the middle of the straight part of the tube characteristic curve. Fixed positive voltage is applied through a relatively small resistance 69 to both screens 71 and 72, and they are also grounded through a relatively large condenser 73. The screen voltages therefore remain substantially fixed and equal at all times. The suppressor grids 74 and 76 are grounded for direct current through resistors 77 and 78 so that they are biased at zero D.-C. level. The suppressors are in addition connected through conductors 79 and 81 to a source of square wave alternating voltage large enough so that all but the positive peak of each cycle completely cuts off all plate current from the mixer-modulator tube to which it is applied. Thus during a part of one-half cycle the tube 53 is made conductive while tube 54 is non-conductive, and in the following half-cycle the tube 54 is made conductive while the tube 53 is non-conductive. However, although a negative potential applied to the suppressor grid prevents plate current passage without regard to what potentials may exist on the screen, control grid and cathode, the reverse is not true. That is, when a suppressor is positive plate current does not necessarily flow, but will flow only if in addition the control grid is sufficiently positive as respects its associated cathode. Additionally, although the suppressors thus partly control plate current, they do not exercise any control over the screen grid current. In fact, the connections and behavior of screen grid, control grid and cathode are similar in their action to the electrodes of two triodes in a direct-coupled differential amplifier, and these elements act together in this manner regardless of the potentials which may be applied to the suppressor grids. Because of this differential amplifier action the application of the input signal through coupling condenser 51 causes the control grid 64 to vary in voltage relative to its cathode equally and oppositely to the variation of the voltage of control grid 52, as respects its cathode.

Let it be assumed for simplicity that the Doppler input signal is sinusoidal, although actually no limitation is imposed on its wave shape. Also let it be assumed that the peak Doppler signal never exceeds the straight part of the characteristic curve of the tubes 53 and 54. Let it be further assumed for simplicity that the square wave generator signal frequency is five times that of the Doppler frequency, although in general there is no limitation on the frequency of either signal or on the ratio of their frequencies. The sinusoidal Doppler voltage wave is represented in graph A of Fig. 3 at 82 and the square wave voltage applied through conductor 81 is represented in graph B. Then, when the square wave input conductor 79 is negative, the plate current of tube 53 must be zero. At the same time the input conductor 81 is positive and the positively charged suppressor 76 permits plate current to flow in accordance with the charge on the control grid 64. At the same time let it be assumed that the input Doppler signal represented by the solid line 82 in Fig. 3 is at the phase represented by the point *a*. As previously explained, a positive charge on the control grid 52 is accompanied by an equal negative charge on the grid 64, represented in Fig. 3 by the point *b* on dashed line 83. This permits less than average plate current to flow in tube 54, causing the plate voltage to be above average. This voltage is the instantaneous output voltage and is indicated at *c* in Fig. 3 on dotted line 84. The output voltage changes during one half-cycle of the square wave from *c* to *d* in accordance with the control by the grid 64 voltage in changing from *b* to *e*. At the time *e* the square wave voltage reverses, the tube 54 plate current is completely stopped and the suppressor 74 is made positive. Since the control grid 52 is still positive its charge represented at *f* causes plate current flow greater than average and a consequent output voltage less than average represented at *g*. This voltage progresses to *h*, when another square wave reversal increases the output voltage to *i*. After another half cycle the average voltage point *j* of the Doppler input wave is reached and the output voltage, represented by the solid line 86, reverses its phase.

This output voltage actually contains sum and difference frequencies generated by the effective multiplication of the input Doppler voltage by the square wave voltage. It also contains higher frequencies produced by multiplication but does not contain any of the two input frequencies whatever if the mixer-modulator is perfectly balanced. That this is so may be inferred from the obvious behavior of the circuit when the Doppler input is zero. Then the current in resistor 58 is exactly the same in each half-cycle of the square wave, so that the output voltage is constant. If the graph of Fig. 3 be inspected it will be seen that the phase of the square wave alternations in the output voltage changes every half-cycle of the Doppler wave form, so that on the average the square wave energy cancels out of the output. Similarly, those portions of the sinusoidal Doppler input delineated as a solid line 86 reverses every half-cycle of the square wave, so that over a period of time their total is zero.

The elimination of the two input frequencies is proven by mathematical analysis. The mixer-modulator in effect receives the Doppler input wave and multiplies it successively by +1 and −1 for equal periods, at a cycle rate equal to the square wave oscillator frequency $\omega_0$. Fourier expansion of a square wave of unit amplitude may be expressed as $$1.27 \sin \omega_0 t + \frac{1.27}{3} \sin 3\omega_0 t + \frac{1.27}{5} \sin 5\omega_0 t + \ . \ . \ . \qquad (3)$$

Multiplying this series by the Doppler input voltage $E \sin \omega t$ gives $$\frac{1.27E}{2}[\cos(\omega_0 - \omega)t - \cos(\omega_0 + \omega)t + \tfrac{1}{3}\cos(3\omega_0 - \omega)t - \tfrac{1}{3}\cos(3\omega_0 + \omega)t + \ . \ . \ .] \qquad (4)$$

This expression contains no term in $\omega_0$ or in $\omega$, proving that neither the square wave frequency $\omega_0$ nor the input Doppler frequency $\omega$ appears as a frequency component in the mixer-modulator output conductor 87. If the mixer-modulator is followed by a filter and the square wave generator frequency is placed above the filter frequency, then only the lowest frequency difference term can pass the filter. For instance, if the input Doppler frequency is 5 kc. and the square wave frequency is 25 kc., the lowest difference frequency is 20 kc. and a filter passing this frequency will have only that single frequency in its output.

*Automatic gain control amplifier*

The mixer-modulator is followed by an automatic gain control amplifier comprising a pentode amplifier stage and cathode follower, the amplifier having its gain automatically controlled to hold the output level substantially constant. The AGC amplifier being followed by the discriminator, has the function of maintaining the input signal to the discriminator at optimum magnitude for all variations in the strength of the Doppler input signal, in order to secure the requisite efficiency of discriminator operation. The AGC amplifier has an input filter tuned to 20 kc. and having an adjustable band width. The purpose of the bandwidth adjustment is to exclude as much noise as possible. If, for instance a Doppler input signal has a 10 kc. center frequency and a spectrum extending from 9½ kc. to 10½ kc., it will in general be accompanied by noise extending uniformly from 1 kc. to 16 kc. All of this noise except that included within the 9½ kc. to 10½ kc. spectrum should be excluded and is excluded by the filter if its bandwidth is no wider than 1 kc. If its bandwidth is wider than this, unnecessary noise is accepted and if the bandwidth is narrower, a part of the useful signal is excluded. Since the signal spectrum has a width of 10% of its central frequency, the spectrum is 100 cycles wide at 1 kc. and 1600 cycles wide at 16 kc. The filter bandwidth is therefore made adjustable between these limits.

The mixer-modulator ouput conductor 87 is coupled through condenser 88, conductor 89, and resistor 91 to a shunt-tuned filter circuit including an inductance 92 and capacitance 93. Series resistance 94 is inserted in this circuit in accordance with the input frequency, the arm 96 of the rheostat 94 being automatically controlled through a shaft 97 in a manner to be described later.

The output of the shunt filter is applied to the control grid 98 of a pentode 99, to the suppressor grid 101 of which is applied a gain control signal. The pentode output is applied from the plate terminal 102 through a coupling condenser 103 to the grid 104 of a triode 106. Output is taken from the cathode 107 thereof through a conductor 108.

*Discriminator*

The discriminator includes a two-channel amplifier, the input of each of the two identical channels being preceded by a sharply-tuned filter, one tuned to just above 20 kc. and one to just below 20 kc. The input conductor 108 from the AGC amplifier is branched to the two filters, one consisting of the inductor 109 and capacitor 111 tuned to 19.700 kc. and the other consisting of the inductor 112 and capacitor 113 tuned to 20.300 kc. Both filters are shunted at the input terminal 114 by a single rheostat 115, which is adjustable by the same shaft 97 that adjusts the rheostat 94 and is for the same purpose of adjusting bandwidth. The branch terminal 114 is provided with a 3-ohm resistor 120 to balance the two branches initially, accurate and permanent balance being essential to high accuracy of frequency tracking.

The gain-controlled input permits the discriminator input voltage to be maintained at all times and for all Doppler input signals at a uniform high level, as mentioned before, both the accuracy of discrimination and the speed of response of the entire frequency tracker being approximately proportional to the voltage magnitude of usable signal applied to the discriminator. From the branch terminal 114 the signal after passing through the lower frequency filter is applied to the control grid 116 of a pentode 117 from the plate 118 of which the signal is coupled through condenser 119 to the control grid 121 of a second pentode 122. Output is taken from the plate 123 of pentode 122 through conductor 124. The higher frequency filter output is applied to the control grid 126 of pentode 127, from the plate 128 of which the signal is coupled through condenser 129 to the control grid 131 of a second pentode 132. Output is taken from the plate 133 of pentode 132 through conductor 134.

The two discriminator amplifier channel output conductors 124 and 134 are connected to two diodes 136 and 137 connected in series in a discriminator detector circuit. Output is taken from the junction of two equal series load resistors 138 and 139, the junction of the diodes being grounded.

In operation, if the input frequency is slightly less than 20 kc., the voltage applied through conductor 124 is greater than that applied through conductor 134. Positive half-cycles are drained to ground from the right side of the detector input series conductor 141, leaving it negatively charged, while diode 137 drains negative half cycles to ground from the right side of input series condenser 142, leaving it positively charged. The negative charge on terminal 143 of resistor 138 being numerically greater than the positive charge on the terminal 144 of equal resistor 139, the center terminal 146 is intermediate in potential between the potentials of terminals 143 and 144 and therefore negative. This action is slightly slowed by the integrating action of a grounded condenser 147 connected to terminal 146 in conjunction with resistors 138 and 139.

Thus the potential of the output terminal 146 is a measure of the divergence of the frequency at the input terminal 114 from the median or crossover design value of 20 kc.

*Automatic gain control*

The input to the discriminator detector diodes is shunted by two series resistors 148 and 149, and since their energization by the two amplifier channels is in phase, the voltage of their junction 151 is the average of the energization voltages. This junction voltage is led through conductor 152 to an automatic gain control diode 153, which rectifies it, and the resulting proportional negative voltage after smoothing by a filter consisting of resistors 154 and 156 and condenser 157 is applied as a gain control voltage through conductor 158 to the suppressor grid 101 of the previously-described AGC amplifier.

*Integrating amplifier*

The discriminator output terminal 146 is connected through conductor 159, relay contact assembly 47B (Fig. 2B) and conductor 161 to the input control grid 162 of a direct-coupled amplifier stage comprising triode sections 163 and 164. These sections are cathode coupled by a resistor 166 and the output is taken from the plate 167. The output voltage is direct-coupled by resistors 168 and 169 to the control grid 171 of a triode stage comprising tube 172, the output being taken from the plate terminal 173 through conductor 174. The output voltage is also fed back from terminal 173 through conductor 176 and a relatively large condenser 177 to the input grid 162 of the integrating amplifier. This feedback is negative in sense and because the condenser 177 is large it feeds back a very large proportion of energy, results in very high linearity of output, and produces considerable smoothing effect, so that the output of the amplifier is proportional to the time integral of the input voltage, rather than to the voltage itself. It follows therefore that for periods of time measured in seconds the output is constant for constant input, and after a change of input the output changes up or down in accordance with the time integral of the input change.

The integrating amplifier is required to be extremely precise in this application, as its function is to smooth out or integrate signals derived from the Doppler input signal and to generate therefrom a signal suitable for control of an oscillator to produce oscillations representing in frequency the central or average power frequency of the Doppler spectrum. The integrating amplifier being of the direct-coupled type is liable to suffer from zero drift error unless compensation is provided and the error produced thereby would be greater than that permitted in an extremely accurate system as here proposed. Zero drift is therefore neutralized in a manner based on that described in the copending application of John W. Gray, Serial Number 212,949, filed February 27, 1951, by means which may here be briefly described as follows.

The input voltage applied to grid 162 is sampled through conductor 178 by a pair of relay contacts 179 and 181, the conductor 178 being connected to one fixed contact 179 while the other fixed contact 181 is connected to a voltage reference terminal 180. The relay armature 184 of relay 45B is actuated by a relay coil 182 at a slow rate, the exact value not being important but which is chosen in this example to result in a dwell of one second on each contact. The terminal conductors 183 of the coil 182 are therefore connected to a suitable one-half cycle per second source of alternating current. The movable contact or armature 184 is connected to the grid 186 of a drift-correcting triode 187. Referring again to the direct-coupled differential stage, the grid 188 is normally returned to fixed voltage equal to the zero level of the input signal applied to the input grid 162, and in the design of this circuit this level is selected to be zero or ground potential. Since any drift in the direct-coupled stage results in some value other than zero at the input becoming necessary to maintain zero output, the practice in using direct-coupled amplifiers is to make a manual adjustment of the voltage to which the grid 188 is returned in order to compensate for zero drift. In this amplifier, however, this compensation is made automatic.

The existence of drift results in the detection by the described sampling operation of an average voltage other than zero at the input grid 162. Such a condition places a small rectangular voltage wave shape having a selected period on the grid 186, and the same alternating voltage form appears amplified by the tube 187 at its plate 189. A second relay 45A consisting of a fixed grounded contact 191, a second fixed contact 192 and a movable contact 193 is energized by the same coil 182 that energizes armature 184. The contact 193 is therefore moved in exact synchronism and phase with the contact 184. The movable contact 193 is connected through a small condenser 194 to the plate 189. The contact 192 is connected to the control grid 188 of tube 164 and also to a large grounded condenser 196.

In operation, the vibrating contact 193 serves as a rectifier of the output of the alternating current amplifier tube 187 and applies the output pulses of direct-current potential to the grid 188. The alternating voltage output of the plate 189 is not only rectified but is also reduced in amount by the voltage divider action of the two condensers 194 and 196 in series in inverse proportion to their capacity ratio. This capacity ratio is made to be of such amount that the direct-current level of the grid 188 is placed and maintained at exactly the direct-current level of the input grid 162, continuously correcting the effect of any drift that may be present.

The final amplifying tube 172 of the integrating amplifier is followed by a relay 47D and a cathode follower tube 197, output being taken from the cathode terminal 198 through conductor 199. The contacts of the relay 47D are opened during the correction periods, as will be more fully explained later. It is desirable to open the circuit at this point during correction because normally the output of tube 172 is not entirely devoid of all of the short-time fluctuations present in the Doppler input. These fluctuations are considerably further reduced by an integrating circuit composed of resistor 201 and condenser 202. During correction periods the "memory" faculty of such a circuit is exhibited, the condenser 202 maintaining the grid 203 of the cathode follower tube 197 at a value that is the short time average of the last impressed voltage, averaged over a period of the order of ¼ second, rather than at the voltage attained at the final instant before relay operation.

The foregoing description tacitly assumes that the direct-coupled amplifier comprising tube sections 162, 164, and 172 has infinite gain, for only then would the level of the input grid 162 be maintained at its theoretical value of ground potential at all times and during changes in the input signal energy. Since, however, the gain is finite, the potential of the input grid 162 varies by an amount equal to the output voltage variation divided by the gain. Positive gain is therefore applied at the grid 188 in such a manner as to keep the input grid 162 very close to zero at all times, so that the amplifier behaves as if it had infiite gain. This is done by referring the drift-correcting input relay contacts 179 and 181 to a voltage derived from the output, instead of referring them to ground, by connecting output terminal 198 through conductor 200 and resistor 205 to junction 180, which is connected to ground through resistor 210.

In operation, a small positive direct-current potential derived from the output terminal 198 and proportional to the potential thereof is applied to the terminal 180 through resistor 205, the resistors 205 and 210 dividing the potential by a suitable amount. Let it be assumed that a negative error signal is applied to the grid 162, the potential of which is partly but not completely restored to zero level by the negative feedback action of condenser 177. The fixed contact 179 is then slightly negative while the fixed contact 181 being connected to terminal 180 is positive. There is therefore a rectangular voltage wave presented to grid 186, which is amplified and results in a positive direct-current potential at grid 188 of such magnitude as to operate, through amplifier tube 172 and the negative feedback condenser 177, to increase the potential of the grid 162 as respects ground. The contact 179 then being at ground potential, the shift of potential of the grid 188 ceases. When the armature 193 engages contact 191 it is grounded, applying ground potential to the side of condenser 194 that is connected thereto. When the armature 184 engages contact 181 it is energized positively thereby applying a selected voltage to the side of the condenser 194 that is connected to anode 189. The armatures now both move to their other contacts, and armature 184 now is energized at ground potential, applying a selected positive voltage step to condenser 194. Armature 193 now being in contact with contact 192 is energized positively, the amount above ground constituting a positive step applied to the associated side of condenser 194, circuit constants being so proportioned that this step is of exactly the same magnitude as that applied to the other side. Therefore there is no energy flow in either direction through condenser 194, and the potential of grid 188 is held at an unchanging level when the input grid 162 is exactly at ground potential, for the assumed magnitude of input signal.

*Local oscillator*

A local oscillator of the free-running multivibrator type is provided to furnish the rectangular waveform voltage to the mixer-modulator, where as heretofore described this rectangular wave is mixed with the Droppler input voltage to form a voltage having a frequency that is the difference of the two applied frequencies. Since the difference frequency is in this example selected to be 20 kc. and since the Doppler input voltage may vary between 1 kc. and 16 kc., the local oscillator must be capable of ranging from 21 kc. to 36 kc.

The oscillator consists of two multivibrator tetrode tubes 204 and 206, Fig. 2A, having capacitive interconnections through condensers 207 and 208 from each plate to the control grid of the other tube. In an oscillator of this type the frequency of oscillation can be controlled by means of the grid bias, consequently the two grids 209 and 211 are connected respectively, through resistors 212 and 213 to a common point 214 which is connected to the control conductor, thus applying to the terminal 214 the output direct-current voltage of the integrating amplifier cathode follower output tube 197 (Fig. 2B), through a path consisting of terminal 198, conductor 199, resistors 236 and 238, (Fig. 2A) and conductor 239. The range of this voltage is selected to be adequate to vary the multivibrator over its entire range.

The multivibrator is designed to insure positive starting and to maintain constant output peak-to-peak potential. The circuits which accomplish these functions include two triode sections 216 and 217 and a neon lamp 218. The triode plates 219 and 21 are connected together and to one electrode 222 of the neon lamp 218, and through a high resistance 223 to a source of positive potential. The cathodes 224 and 226 are connected to the other electrode 227 of the neon lamp 218 and through a resistor 228 to ground. The grids of the triodes are connected to the plates of the tetrodes, grid 229 being connected to plate 231 and grid 232 to plate 233.

When the multivibrator is first turned on, with relatively high direct-current grid bias applied, current may start to flow in both multivibrator tubes 204 and 206, so that both plates 231 and 233 remain at relatively low and equal voltage and oscillations do not start. In that case a condenser 234, connected between the triode plates 219 and 221, and the control grid 211 of tetrode 206, commences to charge until the voltage of the neon tube electrode 222 is sufficiently above that of the electrode 227 to cause the neon tube 218 to fire. The voltage of electrode 222 thereby suddenly drops and the voltage drop is communicated through the condenser 234 to the grid 211, stopping the current flow in tube 206 and initiating the multivibrator free-running oscillation. If the multivibrator oscillations should not start, the neon tube continues to act as a relaxation oscillator until the multivibrator does start. After the multivibrator has started one or the other of the grids 229 or 232 of the triodes is always highly positive, causing a low resistance to be maintained across the neon lamp 218 and keeping it from firing. The limiting action of the triodes meanwhile limits the positive value of voltage attainable by the multivibrator plates to that of the triode cathodes, while the negative limit during current flow through each multivibrator tube equals the voltage drop through that tube under control of its anode resistor.

A multivibrator circuit of this type is fully described in the copending application of John W. Gray, Serial No. 169,971, filed June 23, 1950, now Patent No. 2,653,-242, dated September 22, 1953, assigned to the same assignee as the instant application, and accordingly no further description is necessary.

In the operation of the discriminator loop comprising the local oscillator, mixer-modulator, discriminator and integrating amplifier, the feedback from the integrating amplifier to the oscillator is negative, and in operation the error comprising the output of the discriminator is reduced to a very small value. The output of the integrating amplifier is a stationary or slowly changing direct-current voltage, and the frequency of the local oscillator controlled thereby is at all times equal to the central frequency of the Doppler input signal, plus 20 kc. with an error of the order of no more than 0.1%.

The controlling direct-current voltage is not, however, in general adapted to serve as the output signal of the automatic signal frequency tracker and another type of output signal is or may be required. In the embodiment here described such output signal constitutes a fixed frequency alternating voltage having a magnitude which is directly proportional to the input frequency. Consequently a separate output generator is employed. The output generator is of the induction type, having an output frequency of 400 C. P. S., and rotated by a motor which is very precisely controlled by the output signal of the integrating amplifier.

The output conductor 199 (Fig. 2B), of the integrating amplifier cathode follower output stage is connected through a rheostat 236 (Fig. 2A), conductor 237, fixed resistor 238, and a conductor 239 to the control junction 214 in the local oscillator, which is therefore directly and continuously controlled in frequency in accordance with the direct-current output voltage level of the cathode terminal 198 in the integrating amplifier. The junction 240 of the conductor 199 and the rheostat 236 is connected through resistors 241 and 242 to the slider 243 of a voltage divider 244 having negative voltage applied to one terminal and ground potential to the other. If, for example, the output voltage of the integrating amplifier varies between +40 and +80 volts, it is evident that current will flow from the terminal 240 through resistors 241 and 242 and the voltage divider slider 243, and that an intermediate point such as the junction 245 may be placed at ground potential by an adjustment of the slider 243. This is done automatically by means of a position servomechanism comprising a memory amplifier and a motor positioned to drive the slider 243.

*Memory servoamplifier*

The memory servoamplifier is connected for excitation from the junction terminal 245 through conductor 246, the contact 247 (Fig. 2B), of relay 47C, and conductor 248. The applied direct current is chopped by a chopper 249 comprising a coil 250 excited by any convenient alternating source, the frequency of which is not important, an armature 251 and two fixed contacts 252 and 253. Contact 252 is connected to conductor 248 while contact 253 is grounded. Therefore any direct-current voltage differing from that of ground in conductor 248 produces an alternating voltage at the armature 251. This voltage is conventionally amplified in two amplifier stages comprising tubes 254 and 256, the single output of which is converted into push-pull output by a paraphase amplifier comprising tube 257. The anode resistor 258 is made equal to the sum of cathode resistors 259 and 261, and outputs are derived from both the anode and cathode.

These outputs are applied to a differential phase detection and amplification stage feeding a saturable transformer amplifier. This stage comprises tube sections 262 and 263, the cathodes 264 and 266 of which are connected together and to ground and the anodes 267 and 268 connected to the same source of alternating voltage employed for actuating the chopper through two control windings 269 and 271 of two transformers 272 and 273. These transformers have two primary windings 274 and 276 connected to the source of alternating voltage at conductor 277, and two secondary windings 278 and 279 connected to two output conductors 281 and 282.

When a small positive voltage is applied at input contact 252, the resulting alternating voltage is amplified by tubes 254 and 256 and is applied in opposite phase by tube 257 to the two grids 283 and 284, so that instantaneously one control winding carries less than average current while the other carries more than average current. As the result, the impedances of the corresponding primary windings 274 and 276 are inversely varied, so that the voltage drop in one becomes more than in the other and consequently the voltages induced in the secondary windings 278 and 279 become unbalanced and alternating voltage of a selected phase is produced in the output conductors 281 and 282. On the other hand, if the voltage applied at contact 252 should become less than that of ground, the differential amplifier being supplied from the same alternating source as the chopper and therefore being phase sensitive, the phase of the output voltage in conductors 281 and 282 is reversed.

*Memory loop*

The output conductor 281 of the memory servoamplifier is connected to one winding 286 (Fig. 2A) of a two-phase memory servomotor 287, the return being through conductor 288, the fixed contact 289 and armature 290 of relay contact assembly 48A, conductor 291, contacts 292 and 293 of relay contact assembly 42B, and the other output conductor 282. The motor 287 is connected for mechanical actuation through its shaft 294 to the movable contact 243 of the voltage divider 244, so that operation of the motor varies the voltage of the junction 245. The memory servoamplifier, motor 287, and voltage divider 244 thus comprise a negative feedback loop so connected as to maintain the voltage of the junction 245 very near to that of ground, and in so doing maintaining the voltage of the slider 243 numerically equal but opposite in sense to that of the slider 296 of the rheostat 236. The mechanical position of the slider 243 thus represents with a high degree of accuracy the direct-current control voltage output of the integrating amplifier and therefore also represents the frequency of the Doppler input signal.

*Rate servomechanism*

The memory motor shaft 294 which controls the movable contact of the voltage divider 244 also controls the movable shaft 304 of a second voltage divider 297. This voltage divider is actuated from 400 cycle power conductors 298 and 299 through a phase correction network 301 having the function of producing a voltage divider output having desired amplitude and phase characteristics referred to frequency that are similar to those of the output generator 28, Fig. 1. The function of the alternating current voltage divider 297, Fig. 2A, is to furnish to a rate servomechanism an alternating input voltage signal that represents the central frequency of the input Doppler signal. The rate servomechanism comprises a feedback loop including as components the output generator 28, Figs. 1 and 2B, rate servomotor 27, rate servoamplifier 26, and rate servo control means or subtraction circuit 302, Fig. 2B. The motor shaft 303 driving output generator 28 also drives a corrective alternating current generator or tone wheel 34.

*Rate servoamplifier*

The rate servoamplifier 26 is actuated from the voltage divider 297 (Fig. 2A) through its slider 304, conductor 306, and subtracting resistor 307 (Fig. 2B). The latter is connected from its terminal 308 through a coupling condenser 309 to the control grid 311 of a triode 312 comprising the first amplifier stage. The second stage detects phase as well as amplifies and consists of two triodes 313 and 314 in push-pull arrangement having their grids 316 and 317 grounded through resistors 318 and 319. The cathodes are returned to a negative voltage source through a single common resistor 321. The cathodes are also coupled to a source of 400-cycle power through a condenser 322 and a resistor 323 so that they are varied through a relatively large voltage range, such that when the cathodes are at the positive peak both tubes are cut off, and they are made conductive only at and near the cathode negative peaks. When, therefore, the amplified input signal is applied to the grid 316, it causes increased plate current only if its phase is opposite to that of the voltage applied to the cathode, the grid 317 at the same time during part of the cathode cycle causing decreased plate current. The resulting differential peak signal is smoothed by condensers 326 and 327 and the phase retardation is neutralized by the network consisting of the resistors 328, 329, and 331, and the condensers 332, 333, and 334. The resulting differential signal is applied to a third differential stage comprising the tubes 336 and 337, which is conventional.

In the anode circuit of each of tubes 336 and 337 is the control winding 338 and 339 of a saturable transformer, the primary windings 341 and 342 being energized by 400-cycle power. The secondary windings 343 and 344 are connected through conductors 346 and 347 to actuate the motor 27, its speed and sense of rotation being in accordance with the magnitude and sense of the signal at the amplifier input terminal 308.

*Output generator*

The generator 28 is of the induction type having a constant frequency output which as an example may be 400 C. P. S., namely, that of the excitation voltage supplied to it through the mains 348. The generator output voltage is in linear proportion to its speed of rotation, the non-linearity being less than the overall error demanded of the automatic signal frequency tracker. The generator voltage output constitutes one of the output signals of the automatic signal frequency tracker, a voltage divider 349 being provided in the output conductor 351 to permit manual scalar adjustment. The other output of the frequency tracker is mechanical, a mechanical output terminal being provided consisting of a shaft 352 rotated by the motor 27 through a variable ratio gear 353 for manual scalar adjustment. The generator output terminal 354 is also connected to a feedback circuit through conductor 356 and feedback subtracting resistor 357 to the amplifier input terminal 308. The sense of feedback is arranged to be opposite to that of the input signal applied through resistor 307, so that the motor speed will increase until the feedback voltage is substantially equal to the input signal voltage. The motor speed and the generator output voltage then represent with accuracy the Doppler input signal central frequency.

*Tone wheel generator*

The tone wheel or corrective alternating current generator 34 is of the variable reluctance type, and is shown in greater detail in Fig. 4. It comprises a coil 358 on an open permanent magnet core 359. The permanent magnet 359 has a soft iron pole piece 361 affixed to one end, the other end of the core being cut to hexagon shape 362 to enable it to be turned with a wrench or pliers. The pole piece is threaded at 363 for engagement with the frame so that by turning the core and pole piece these elements may be advanced toward or retracted from a narrow wheel 364.

The wheel 364 is made of soft iron and is provided with, say, 267 teeth, so that when rotated by the motor 27, Fig. 2, at a maximum speed of 3600 R. P. M. a maximum frequency of over 16 kc. is produced. The pole piece 361, Fig. 4, is hollowed at 366 so that its end forms a cup, the edges of which approach the wheel 364 at two points 367 and 368. The cup diameter is such that it spans an integral number of teeth. Therefore, as the wheel 364 rotates, a complete cycle of variation of the reluctance of the gap between the wheel 364 and the pole piece 361 is passed through once for every tooth that approaches the pole piece. The resulting variation of magnetism in the core 359 generates an alternating voltage in the coil 358. One coil terminal 369 is grounded and the other terminal conductor 36 is connected to the contact 372 of the relay 47A (Fig. 2A). It is apparent then that a voltage is applied by the tone wheel generator to this contact 372 having a frequency that is directly and exactly proportional to the shaft speed of the motor 27.

*Correction timer*

The components so far described constitute without the tone wheel generator an operative system that comprises a discriminator loop actuated by a Doppler spectrum input signal and that in turn actuates a rate servo loop delivering outputs representing the Doppler spectrum central frequency. However, although for any particular frequency the output voltage and shaft speed may be adjusted to be exact, it is found as a practical matter that, over the full range of input frequencies, the output signals contain inaccuracies. As stated heretofore these inaccuracies arise principally because of the difficulty of making the control characteristic of the local oscillator and the control characteristic of the rate servo loop exactly alike over the entire range of operation of each. Therefore the substitution method of periodic correction is employed to secure greater accuracy. During, say twenty seconds out of each twenty-two the circuit is connected in the normal fashion as illustrated in the drawings. The circuit is then changed by means of relays to form a corrective servomechanism loop during the remaining two seconds.

The relays are operated by a correction timer 32, Fig. 1, which is illustrated schematically in Fig. 2A. A free-running multivibrator comprising two tube sections 373 and 374 contains a relay winding 376 of a relay 46 in the positive voltage connection to one of the plates 377. Circuit parameters are proportioned for plate current flow in tube section 374 and through relay winding 376 for two seconds in each cycle, operating the relay contacts 378 and 379, and for plate current flow in tube section 373 for twenty seconds in each cycle, the period of oscillation being twenty-two seconds. During these twenty-second periods when the relay winding 376 remains unenergized its contacts 378 and 379 of the contact assembly 46A remain open.

The contacts 378 and 379 operate the winding 381 of a second relay 48 having the previously-mentioned contact assembly 48A, the armature contact 290 being connected to an output terminal of the memory servoamplifier, the fixed contact 289 being connected to the memory servomotor 287 and the fixed contact 382 being connected through conductor 383 to a two-phase corrective servomotor 384. One phase winding of this motor is connected to 400-cycle power mains, the other winding being connected through conductor 383 to the relay contact 382 as just descrbied and to the conductor 281. The output shaft 386 of the corrective servomotor is connected to the slider 296 of the rheostat 236.

*Switching circuit*

The switching operations for converting the frequency tracker circuit from its connections for regular operation to those for corrective operation and back again as well as the operation of the system itself are more easily understood by reference to Fig. 5. The timer 32, previously described in detail, operates through the contacts of relay 46A, and the relays 48 and 47. The latter relay has four sets of contacts, 47A, 47B, 47C and 47D, which are shown for convenience in Fig. 5 separated from the relay coil and in their connected positions in the schematic wiring diagram.

In Fig. 5 the relay contacts are illustrated in what may be termed their normal positions, that is the position which they assume during the 20 second time interval of regular operation wherein the input Doppler signal is applied to the system. This signal is applied from the terminal 11 through the upper contact of relay contacts 47A to the mixer-modulator 13 on which there is also impressed the output of local oscillator 14 so that a difference frequency output signal is obtained which is in turn impressed on the fixed frequency discriminator 16 through the conductor 89 and automatic gain control amplifier 389. Any output which may be present in the discriminator because of unbalance of the difference frequency signal as respects the tuned circuits of the discriminator is impressed through the upper contact of 47B on the input of the integrating amplifier 387. This amplifier as heretofore described produces a direct current voltage output which when impressed on the local oscillator 14 through the conductor 199 and resistances 236 and 238 controls the frequency of oscillations generated thereby and acts if necessary to readjust the oscillator frequency so that the difference frequency produced by beating the oscillator signal and input signal is maintained constant.

The output generator 28 and the tone wheel 34 are controlled by a circuit which includes the memory servoamplifier 388, the rate servo system operating motor 27 and the voltage divider or adding circuit consisting of variable resistor 236, resistors 241 and 242 and voltage supply potentiometer 244, so that the voltage of the generator 28 and the frequency of the tone wheel are each a measure of the amount of signal applied to the local oscillator and hence of the frequency of the input signal.

The input to the memory servoamplifier 388 comprises an alternating potential varying between ground and the potential of terminal 245 at the juncture of resistances 241 and 242. This input is derived from a circuit which includes the vibrating relay 249 one contact of which is connected to ground and the other over a circuit comprising the upper contact of 47C, conductor 250 and terminal 245. If for any reason therefore the potential of terminal 245 departs from ground potential, an input signal will be impressed on the input of the memory servoamplifier and an output signal will be obtained which will be impressed on conductors 281 and 282.

This output circuit when the relay contacts are in their normal position may be traced over the circuit comprising conductor 281, memory motor 287, conductor 285, lower contact of relay 48, conductor 291, contact 42B of relay 42 and conductor 282. If then an output signal is present the motor 287 will be made to revolve and in so doing it varies the position of contact 304 on potential divider 297 and hence the signal applied to the rate servo system controlling the speed of the motor 27 and therefore the voltage of the generator 28 and frequency of the tone wheel 34.

At the same time the motor 287 adjusts the position of the contact 243 on the potential divider 244 in such a direction that the potential applied to contact 243 is made equal and opposite to the potential applied to contact 296 and thus the midterminal 245 of the equal resistors 241 and 242 connected between these points is brought back to ground potential, thus reducing the memory servo amplifier input to zero so that likewise no output is produced thereby to energize the motor 287 which then ceases to rotate.

It will be seen, therefore, that if due to a change in frequency of the input signal a new potential is impressed on the oscillator 14 through the resistance 236 to cause it to operate at a new frequency so that the difference signal is returned to its fixed value, the potential of terminal 245 will at the same time depart from ground potential or balance which is not restored until the motor 287 has been operated so that a new potential is applied to the rate servo system controlling the motor 27 resulting in a new output voltage which corresponds in magnitude to the new frequency of the input signal.

For introducing corrective factors to compensate for difference in characteristics of the elements over the full range of operation the relays 46A, 47, and 48 are switched to their positions opposite from that illustrated in Fig. 5. In the corrective position the timer energizes relay 46A which in turn energizes relay 47 thereby actuating contacts 47A–47D to their opposite positions of engagement.

The input circuit is now disconnected from the mixer-modulator 13 and instead the output of the tone wheel is connected thereto through the lower contact of relay 47A. At the same time the output of the discriminator 16 is disconnected from the input of the integrating amplifier 387 by disengagement of relay 47B with its upper contact and the integrating amplifier is operated in the manner previously described by operation of its internally connected relay 47D.

The relay 47B in engaging its lower contact connects the output of the discriminator 16 to the input of the memory servoamplifier 388 through the lower contact of relay 47C so that the potential applied to one contact of the chopper 249 is now that of the output of the discriminator rather than the potential of terminal 245, the circuit from the terminal 245 to the upper contact of chopper 249 being broken by disengagement of the relay 47C with its upper contact. Thus the signal which operates the memory servo 388 is now the discriminator output, if any.

The output circuit of the memory servoamplifier 388 is also altered by the operation of relay 48 which is actuated to cause its armature 48A to disengage its lower contact and to engage its upper contact. The output circuit of the memory servoamplifier 388 now therefore extends over the conductor 281, correction motor 384, upper contact of relay 48, relay armature 48A, conductor 291, armature 42B and conductor 282. Memory motor 287 being disconnected from this circuit cannot be actuated and hence the contacts 304 and 243 on potentiometers 297 and 244 retain the position to which they were last adjusted and the speed of the motor 27 is not altered during this switched condition.

Suppose now because of calibration errors or the like that at the time of switching the speed of the motor 27 was not exactly proper to produce a frequency generated by the tone wheel which exactly corresponded to the center frequency of the input signal received just prior to switching. Since the tone wheel frequency is different and is mixed with the local oscillator frequency to produce a beat frequency this new beat frequency will also depart from the beat frequency developed just prior to switching. Since we may also assume that the frequency of signal generated by the oscillator had been stabilized to differ from the center frequency of the input signal by a fixed amount just prior to switching in the manner described, this new beat frequency will depart from the center frequency of the discriminator 16 so that an output potential will be produced thereby.

This output results in actuation of the correction motor 384 which adjusts the contact 296 on the adjustable resistor 236 until such new potential is applied to the oscillator 14 that its new signal frequency is such as to produce a beat signal of the pre-selected frequency when mixed with the signal frequency of the tone wheel 34. Stabilization in this respect having been achieved the timer 32 returns the relays to the normal position. It is to be particularly noted, however, that at this time of switch back the oscillator 14 has been adjusted to a new frequency which will produce a new error signal at the output of discriminator 16. Thus the memory servo 388 now acts through the memory motor 287 to readjust contacts 304 and 243 and the correction is thus inserted through the rate servoamplifier and motor 27 to operate generator 28 and tone wheel 34 at new speeds so that the voltage amplitude of the one and the signal frequency of the other do exactly correspond with the center frequency of the input signal. The change in potential as applied to the oscillator 14 by reason of adjustment of the contact 296 on the adjustable resistor 236 is occasioned because of the fact that the resistor 236 constitutes a portion of a series circuit through which grid current of the oscillator 14 flows. This series circuit extends from ground through conductor 199, resistor 236, conductor 237, resistor 238 and one or the other of resistors 212 or 213 depending on which of the multivibrator tubes 204 or 206 of the oscillator 14 is conducting at the time.

*Signal-to-noise detection*

The automatic signal frequency tracker as so far described is designed for operation either in conjunction with gain-controlled radar equipment to supply what has been termed the Doppler signal or in conjunction with any other equipment supplying a similar or better signal and similarly gain-controlled. In any case the Doppler input signal applied to the input terminal 11 is presumed in this design to have a relatively constant peak magnitude. In such instance the output of the AGC amplifier applied to the discriminator will have constant peak amplitude but a variable signal-to-noise ratio depending on the strength of the usable signal relative to noise in the Doppler input signal. Below a selected signal-to-noise ratio in the signal spectrum the discriminator fails to select the central signal frequency and the output of the frequency tracker becomes erratic.

This threshold signal-to-noise ratio is selected in this design to be at unity ratio, although any other ratio can be selected with a corresponding change in the speed of changing frequency signal that will be tracked. In order to prevent any production of erratic operation by the frequency tracker the signal-to-noise ratio is continuously measured, and when it falls below the selected value, the circuit connections are changed to continue the last emitted magnitude of output signal. In addition the circuit is so changed that the frequency tracker commences searching over the entire range of possible input frequencies so that when the input signal-to-noise ratio again rises above the threshold value it will be automatically "perceived" by the frequency tracker. The circuit is then restored by the signal-to-noise ratio detector to its previously described condition.

Referring to Fig. 5, the signal-to-noise detector 37 is actuated through conductor 391 from the output of mixer-modulator 13. The signal-to-noise ratio detector 37 actuates a relay 41 the contacts 41A of which actuate a second relay 42 having contacts 42A and 42B. The contact 42B is normally closed and as before described normally completes the output circuit of the memory servoamplifier in regular operation when the signal-to-noise ratio is greater than unity. When the ratio is less than this value the relay 41 is released, its contacts 41A are made, the relay 42 is operated and the contacts 42B broken, interrupting the output circuit of the memory servoamplifier 388. This of course isolates the rate servomechanism so that it continues to emit the frequency tracker output signal at conductor 392 for the duration of the isolation, thus exercising its "infinite memory."

A second set of contacts 42A is normally open. When, however, the signal-to-noise ratio falls to unity or below and the relay 42 is operated, the contacts 42A are closed. This connects the input of the integrating amplifier to a source of positive voltage through the normal fixed contact 394 of contact 43A of a relay 43. The action of this positive voltage is to override any discriminator error signal and to cause the integrating amplifier output voltage to fall at a rate proportional to the integral of the positive voltage step signal thus applied. This causes the oscillator 14 to oscillate at a continuously decreased frequency.

When the decreased oscillator frequency nears 20 kc., corresponding to zero frequency input signal at the input terminal 11, the oscillator output through conductor 396 actuates a sweep limiter circuit 397, in turn actuating the relay 43. This operates the contact assembly 43A, causing the armature 398 to make contact with the fixed contact 399 and applying a large negative voltage step to the input of the integrating amplifier 387. This causes the output thereof to become highly positive very rapidly which in turn rapidly returns the oscillator 14 to the high-frequency end of its scale and to oscillate at about 36 kc. The relay 43 releases as soon as the oscillator output leaves the vicinity of 20 kc., restoring the armature 398 to contact with the fixed contact 394, thus applying again a small positive voltage step to the integrating amplifier 387 and causing it to commence another downward search sweep. This cycle continuously repeats for an indefinitely long time or until an input signal appears, when the signal-to-noise ratio detector is again operated, leaving the discriminator servomechanism at a frequency setting within the range of operation of the discriminator 16 on the input signal. That is, the frequency tracker "locks" to the input signal.

*Signal-to-noise detector*

The signal-to-noise ratio detector is actuated from the output mixer-modulator through conductors 89 and 391 (Fig. 2A). The actuating signal is passed through two isolating resistors 401 and 402 to two separate bandpass amplifier channels. One has as its first element a shunt-tuned filter comprising inductance 403 and capacitance 404 tuned to 18 kc. and the other has a similar element comprising inductance 406 and capacitance 407 tuned to 20 kc. Each channel includes a triode amplifier 408 and 409, the outputs of which are detected by diodes 411 and 412 and subtracted by resistors 413 and 414. The direct-current voltage then of the intermediate terminal 416 of the resistors 413 and 414, smoothed by condenser 417, is a function of the relative energies at 18 kc. and 20 kc. applied to the respective upper and lower channels in the figure.

As the input signal spectrum when beat with the local oscillator frequency produces a difference frequency of 20 kc., the signal energy plus noise within the signal spectrum passes the rejection filter 406, 407 and actuates tube section 409. Noise applied to the input terminal 11 outside of the signal spectrum and 2 kc. below its central frequency is selected by the filter 403, 404 and is applied to the triode 408. This tube therefore receives noise only, not admixed with the useful signal. Therefore when the signal energy equals the noise energy within the Doppler spectrum a positive voltage exists at the junction 416.

This voltage is applied to the input grid 418 of a differential direct-coupled amplifier comprising tube sections 419 and 421, having a relay 41 connected in series with a diode 422 between the tube anodes 423 and 424. The relay 41 is adjusted for marginal operation so that as the junction 416 becomes more positive the tube section 419 draws more plate current until, at the selected voltage of junction 416 representing a signal-to-noise ratio of unity, the voltage of anode 423 has been reduced to the point of operation of the relay 41. The function of the diode 422 is to prevent operation of the relay 41 if the local oscillator, in sweeping, sweeps through 18 kc., any slight unbalance in the mixer-modulator then permitting enough 18 kc. voltage to reach the signal to noise detector to cause it to lock to that frequency, in the absence of the diode.

When the relay 41 is in the operated condition, as during reception of a Doppler input signal having a signal-to-noise ratio of unity or higher, the contacts 41A are opened, releasing a relay 42. When, however, the energy in the 20 kc. channel becomes less than the selected value in relation to that in the 18 kc. channel, as indicated by the falling of the positive voltage of the junction 416 to less than the selected threshold value, the relay 41 releases its armature and the contacts 41A close, operating relay 42.

*Sweep-limiter*

The sweep limiter is actuated through conductor 396, Fig. 2A, from one of the output conductors 79 of the local oscillator. The voltage applied to the sweep limiter thus normally has a frequency between approximately 21 kc. and 36 kc. as before stated. This voltage is applied through a resistor 426 and coupling condenser 427 to the cathode 428 of a diode 429, the anode 431 thereof being grounded through a by-passed resistor 432. The diode is shunted by a shunt-tuned resonant circuit comprising inductance 433 and capacitance 434, tuned to 20 kc., the function of the resistor 426 being to control the Q of the resonant circuit. The anode 431 of the diode 429 is connected to the grid 436 of a triode 437 forming with the triode 438 a direct-coupled differential amplifier. The grid 439 of the triode 438 is returned to −1. volt bias so that with no input signal the anodes 441 and 442 are at about the same potential. These two anodes are connected to the two terminals of a relay 43 having the contacts 43A.

When the frequency tracker is searching, and as the local oscillator frequency becomes less and nears 20 kc., the impedance of the resonant circuit 433, 434 increases, consequently increasing the voltage across it, until a selected voltage is applied to the diode 429. This diode rectifies the voltage and applies a negative voltage to the grid 436 of triode 437, reducing its anode current and increasing its anode potential, thus causing the resulting difference in potentials of the anodes 441 and 442 to operate the relay 43. This operates the contacts 43A, applying a high negative voltage through conductor 443, contact 42A and contact 47B to the input of the integrating amplifier as before described, causing the oscillator to fly back to the maximum end of its frequency range. This in turn removes the actuating voltage from the diode 429, so that the relay 43 releases its armature and the negative voltage applied to the integrating amplifier is replaced by positive voltage.

Upon first turning on the frequency tracker the oscillator frequency is lower than 20 kc. The signal-to-noise ratio detector will under such a condition have a noise input without any useful signal, and therefore will through the contact 43A as described apply a positive step voltage to the integrating amplifier, preventing the oscillator from rising as high as 20 kc. Since the reactor 433 short-circuits the diode 429 under this condition, this diode cannot act to bring the local oscillator to its proper range of output frequency. There is therefore provided another diode 444 to prevent this malfunction.

The anode 446 of this diode 444 is connected to the triode grid 436 and its cathode 447 is connected through conductor 448 to a junction 449 between resistors 451 and 452, the remaining terminal 453 of resistor 451 being connected to high negative potential while the remaining terminal 454 of resistor 452 is connected through conductor 456 to the output of the integrating amplifier at the junction 240. Therefore, when the output direct-current potential of the integrating amplifier is below a selected value the cathode 447 of diode 444 is placed at a low value and that potential is placed on the grid 436 of the triode 437, being of such value as to operate the relay 43, causing high negative voltage to be applied through conductor 443 to the input of the integrating amplifier and causing the oscillator to jump to its maximum frequency output.

In a second embodiment of the invention illustrated in Fig. 6 the memory servomechanism is eliminated, the "memory" function being exercised by an added position servomechanism. A correction integrator is also added to exercise the integration function during correction periods. The rate servomechanism loop is actuated directly from the discriminator loop in the absence of the intermediation of the memory servomechanism. Most of the components of the second embodiment are identical with those of the first described embodiment, but their interconnections are somewhat different as depicted in the relay schematic diagram, Fig. 6.

Referring to Fig. 6, all components that are identical with those already described in connection with preceding figures are identified by the reference characters previously employed for them. All relays are illustrated in position for normal and regular operation, a strong input signal being assumed, and alternating periods of regular and corrective operation of 20 seconds and 2 seconds respectively are assumed to be employed as in the previously-described embodiment. In depicting relays having more than one set of contacts the relay coil is shown in position for operation of one set, the other set or sets being shown in locations most convenient for clarity, all contact sets of the same relay bearing the same reference numeral but being distinguished by different reference letters.

The input signal is of the character selected in describing the first embodiment of the invention. The signal is applied at input terminal 11, Fig. 6, from which the signal is applied through relay contact 507A to a mixer-modulator 13. The output of mixer-modulator 13 is applied through conductor 89 to an automatic gain control amplifier 389, and thence to a 20 kc. discriminator 16. The discriminator error signal output is passed through contacts 507B and 502A to the input of a main integrator 511, the output of which is passed through a resistor 512 to a local oscillator 14. The local oscillator 14 output is applied to the mixer-modulator 13. A signal derived from the discriminator error signal output is also applied through conductor 513 to an automatic gain control circuit 514 the output signal of which is applied through conductor 516 to the automatic gain control amplifier 389, controlling its output to substantially constant level.

This circuit constitutes a closed discriminator loop which operates as a servo system in a manner similar to that of the discriminator servomechanism loop in the first-described embodiment and which therefore need be only briefly stated.

Input signals are modulated with the local oscillator output and the modulation product having a frequency that is the difference of the two mixer-modulator input frequencies is amplified and brought to constant level in the automatic gain control amplifier 389 and is applied to the discriminator 16, which emits an error signal dependent on the divergence of the frequency of the signal from 20 kilocycles. The discriminator error output is applied to the main integrator 511, which emits a direct-current output voltage having a magnitude representing the integral of the input error signal. A voltage derived partly from this output voltage is applied to the local oscillator 14 to control its frequency of oscillation. The error signal applied by the discriminator to the main integrator continuously changes the integrator output in such direction as, through change of oscillator frequency, to reduce the error signal toward zero, the main integrator output voltage then becoming constant. This action constitutes servo operation of the loop to a stable and accurate null point, and the apparatus comprises a servo system.

The mixer-modulator 13, automatic gain control amplifier 389, automatic gain control circuit 514, 20 kc. discriminator 16 and local oscillator 14 are each identical with the corresponding components of the first-described embodiment of Figs. 2A, 2B and 5, and therefore the detailed descriptions are not repeated. The main integrator 511 is slightly different from the integrating amplifier of Fig. 2B, the relay contacts 47D and associated integrating and storing network consisting of resistor 201 and condenser 202 being omitted as non-essential. The positive feedback connection 200 from the output to the drift-correcting tube is also omitted as being an unnecessary refinement in the application made of the invention.

*Main-integrator*

The main integrator 511 is depicted in detail in Fig. 7, and comprises a direct-coupled differential stage employing tubes 517 and 518, amplifier stage tube 519, cathode follower output tube 521, and drift corrector tube 522. The direct-current error signal from the discriminator is applied through conductor 523 to grid 524 resulting in an amplified signal of like polarity applied to grid 526 of tube 519. The output from plate 527 is applied to the grid 528 of cathode follower 521 and the output is secured at conductor 529 from an intermediate tap on resistor 531.

Integration occurs through the Miller negative feedback action of condenser 532 connected from plate 527 to grid 524, tending to counteract voltage change of grid 524 caused by the input signal. The reference voltage of grid 524 is that of ground but the grid 533, being controlled by the drift-correcting tube 522, assumes a potential different from ground by the amount of tube drift in the differential stage, as explained in connection with the integrating amplifier of Fig. 2B. The relay contacts 505A and 505B are actuated simultaneously by a single relay coil 505 which is operated on alternating current having a frequency that may be of any amount between one cycle per minute and 60 C. P. S. but in this example is selected to be one-half cycle per second.

It is desired to secure from the frequency tracker an output signal consisting of an alternating voltage having a voltage magnitude representative of the frequency of the frequency tracker Doppler input signal. It therefore is impossible to employ the accurate direct voltage output of the main integrator 511 directly as the output signal of the frequency tracker, but this direct-current voltage output must be employed indirectly in conjunction with a rate servomechanism that does have the desired type of output signal.

The rate servomechanism components are depicted in Fig. 6 as comprising a subtracting circuit 534, a rate servoamplifier 26, servomotor 27, generator 28, and line compensator 536. The input signal to the rate servomechanism consists of the direct voltage secured from the output conductor 529 of the main integrator 511 through a voltage divider 537 for initial manual adjustment. The output of the rate servomechanism is secured through the output conductor 538 from the generator 28, and consists of a 400 C. P. S. voltage having a voltage magnitude that constitutes the output signal of the frequency tracker. The negative feedback connection 539 of the rate servomechanism is secured through the secondary winding 541 of the line compensator 536 and the normal contacts of a relay contact set 509A and is applied to the alternating current feedback conductor 542 of the subtracting circuit 534. The rate servoamplifier 26, motor 27 and generator 28, as well as the connected tone wheel circuit 34, are identical with the similarly named and numbered components previously described in detail in connection with Fig. 2B, and therefore will not be again described.

*Subtracting circuit*

The subtracting circuit 534 is illustrated schematically in Fig. 8. It receives through conductor 543 from the voltage divider 537 a direct-current voltage signal representing by its voltage magnitude the central frequency of the Doppler signal spectrum input to the frequency tracker at input terminal 11. This subtracting circuit D.-C. input signal is applied through the normal contacts 544 and 546 of relay contacts 509C and an isolating resistor 547 to the control grid 548 of a triode 549.

The 400-cycle feedback signal of the rate servomechanism is applied from feedback conductor 542 through coupling condenser 551 to the control grid 552 of a triode 553. The anode 554 thereof is coupled through condenser 556 to the control grid 548 of tube 549 so that an amplified alternating-current feedback signal is applied thereto superimposed on the direct-current input signal. The tube 549 together with tube 557 together comprise a balanced amplifier stage coupled by a common cathode resistor 558. The grid 559 is returned to a voltage divider 561 which is so adjusted that at a selected voltage equal to the lowest level of direct-current input signal representing the minimum frequency Doppler input signal, the stage has zero output, that is, the situation in which the voltages of the anodes 562 and 563 are equal. The stage is made to be responsive to the alternating current input signal by application to the cathodes 564 and 566 of a relatively large alternating voltage having a frequency of 400 C. P. S. through the resistor 567 and condenser 568. The magnitude of this voltage applied to the cathodes is so great that the tubes 549 and 557 may conduct only during the negative peaks thereof.

During these periods the differential conductivity depends first upon the difference of the grid voltages caused by the amount and sense of divergence of the direct-current signal at grid 548 from the fixed bias of the grid 559, and depends second upon the amount and sign of the alternating voltage applied to grid 548 in relation to the phase of the cathode voltage. Any differential voltage existing between the anodes 562 and 563 is applied through conductors 569 and 571, phase advancing networks 572 and 573, and conductors 574 and 576 to the differential rate servoamplifier 26 (Fig. 6) which, being identical with the final differential stage and saturable core amplifier described in connection with Fig. 2B, is not here further described.

Referring to Figs. 6 and 8, in operation of the rate servo loop if the motor 27 is initially stationary, a direct-current positive signal applied at the grid 548 of a small fraction of a volt will cause rotation of the motor 27 in a specific direction, driving the generator 28 and resulting in an alternating voltage which in turn will cause a voltage change at the grid 552 in sense opposite to that caused by the direct-current input signal, so that the increase of speed of the motor is terminated and it quickly arrives at such terminal speed as to cause the effect of the feedback voltage nearly to equal the effect of the direct-current input signal, the difference being the error signal necessary to maintain the motor at the terminal rate of rotation.

*Line compensator*

The line compensator circuit is shown schematically in detail in Fig. 9. The input signal thereto is a 400-cycle voltage secured from the output generator and applied through conductor 539 to the secondary winding 541 of a transformer 577 and thence through relay contacts 509A and conductor 542 to the subtracting circuit previously described. The conductor 539 is also connected through conductor 578 to the control grid 579 of a triode 581 operated as a paraphase amplifier, having equal resistors 582 and 583 in the anode and cathode connections respectively. The anode and cathode are coupled through equal condensers 584 and 586 to the terminals 587 and 588 of four transformer windings 589, 591, 592, and 593 in series, a resistor 594 being placed in series with the connection from terminal 588 to the cathode 596 to equalize the impedances of the two tube connections as presented to the transformer terminals 587 and 588.

In operation, alternating voltage from the output generator applied to the grid 579 causes equal and opposite instantaneous voltages to be applied to the transformer terminals 587 and 588. The voltage of the midtap 597 is then at all times at a median and unvarying potential. This midtap 597 is connected to the grid 598 of a triode 599 connected as a cathode follower. Its cathode 601 is connected to ground through the primary winding 602 of the transformer 577.

The four transformer windings 589, 591, 592, and 593 are the windings of four separate transformers 603, 604, 606, and 607, each having a second winding 608, 609, 611, and 612, respectively. These four windings are also connected in series with each other between the end terminals 613 and 614. The junction 616 between the windings 609 and 611 is connected to a source of positive potential. Two triodes 617 and 618 are connected in pushpull to form a direct-coupled differential amplifier stage, being coupled by the common cathode resistor 619. The grid 621 of the tube 618 is connected to the slider 622 of a voltage divider 623 so that a selected fixed positive voltage bias can be applied to this grid. The anodes 624 and 626 are energized with positive direct-current voltage by connection to the transformer terminals 613 and 614. Application of voltage to the grid 627 which is different from the voltage of the grid 621 then results in equal and opposite changes in the plate currents of the tubes, the sense of the change in each tube depending on whether the voltage applied to the grid 627 is above or below that of the grid 621. Rectified voltage derived from the 400-cycle supply mains through conductor 628, rectified by diode 629 and filtered by condensers 631 and 632 and resistors 633 and 634 is applied to the grid 627.

In operation, the slider 622 is adjusted to apply to the grid 621 a voltage that just balances the desired normal level of the 400-cycle voltage. If then the latter voltage should increase, the plate current of the tube 617 is increased and the plate current of the tube 618 is equally decreased. The current through transformer windings 608 and 609 is therefore increased, reducing the reluctance of the cores of transformers 603 and 604 and reducing the impedance voltage drop through the companion windings 589 and 591. Similarly the impedance voltage drop through windings 592 and 593 is at the same time increased. This displaces the voltage of the midtap 597 from zero to a voltage nearer that of the anode 636 of triode 581. This alternating voltage is applied to the grid 598 of triode 599, causing alternating plate current to flow in this tube and in the transformer winding 602.

The circuit polarities are so arranged that the resulting induction from transformer winding 602 causes a reduction of current in the other winding 541, and circuit magnitudes are so arranged that this causes a reduction of voltage in the outgoing conductor 542 that exactly counteracts, in the subtraction circuit and the subsequent rate sevroamplifier circuit, the effect of the increased 400-cycle voltage. Any decrease of 400-cycle voltage below normal has the opposite effect of increasing the voltage applied through transformer winding 541 to the outgoing conductor 542 to counteract the effect of the supply voltage drop.

Polarities of the transformers 603 and 604 are reversed so that induction from winding 608 to winding 589 is completely cancelled by induction from winding 609 to 591. The transformers 606 and 607 are also reversed in polarity with respect to each other to accomplish the same purpose. Thus there is no induction to windings 589, 591, 592, and 593 and the function of each transformer is that of a saturable core reactor, rather than a transformer, the four windings 608, 609, 611, and 612 being the control windings.

The described regulation of the 400-cycle voltage corrects the fedback voltage in conductor 542 (Fig. 6), which is applied to the subtraction circuit 534 and therefore corrects any error in the speed of the motor 27 that otherwise would be caused by changes in 400-cycle line voltage. However, the frequency tracker output conductor 538 is connected between the generator 28 and the line compensator transformer winding 541 and therefore reflects in its output voltage all line voltage error. This, however, is generally desired when the utilizing equipment connected to the output conductor 538 is also connected to the same 400-cycle power supply, because variations in the power supply voltage can then be made to cancel out. However, if it is desired to secure a line compensated signal from the frequency tracker, it can be secured from a point after the line compensator, as indicated by the dashed line 637.

*Signal-to-noise ratio detector*

The signal-to-noise ratio detector 37, Fig. 6, is identical with that described in connection with Fig. 2A, and is actuated from the output of the mixer-modulator 13 through conductors 89 and 638 to operate a relay 501 when the ratio of signal-to-noise within the signal spectrum has a value of at least unity, in the same manner as described in connection with Fig. 2A. The lower contact 501A of relay 501 operates relay 502 when the signal-to-noise ratio is less than unity.

The relay 502 has three sets of contacts: contacts 502A start the main integrator 511 to sweeping, contacts 502B disable the corrector timer, and contacts 502C operate two other relays to disconnect the rate servomechanism from its input circuit and to cause this circuit to produce continuously the last-produced output signal. This function may be termed "memory," and requires the use of a position servomechanism circuit which has, as additional functions, the operation of the bandwidth or Q switches in the AGC amplifier and in the discriminator, and the operation of mechanical dials presenting the frequency tracker output signal in the form of dial indication.

*Position servomechanism*

The position servomechanism is operated through a manually adjusted voltage divider 639 from the output of the generator 28. The slider 641 of the voltage divider 639 is connected to the input of an alternating current amplifier 642 having approximately unity voltage gain but having a high degree of linearity through the use of a large amount of negative feedback, and having low impedance output taken from the cathode of the final stage.

The amplifier output is connected through conductor 643 to one terminal 644 of a voltage divider 646 which is supplied with power at its terminals by a 400-cycle power source through an isolating transformer 647. The phases are so arranged that the voltage to ground of the slider 648 of the voltage divider 646 is, at any position of the slider, the difference between the induced voltage drop between slider 648 and terminal 644 and the voltage introduced through conductor 643. The slider 648 voltage is applied through conductor 649 and relay contacts 509D to the input of a position servo-amplifier 651, the output thereof being connected through relay contacts 508D to a servomotor 652.

This motor is connected to the slider 648 through a shaft 653, the direction of motion being such as to tend to reduce the amplifier error input signal in conductor 649 to zero. When the slider 648 has been thus positioned and the servomechanism has servoed to its null, with the motor 652 brought to a condition of rest, the induced voltage drop between slider 648 and terminal 644 substantially equals the voltage applied through conductor 643, and the physical distance between the slider 648 and the terminal 644 substantially represents the value of this voltage and therefore also represents the magnitude of the output voltage data and of the Doppler input signal frequency. Since the motor 652 is geared or otherwise connected to the slider 648, the angular position of the motor shaft also represents the output data. The motor 652 also drives the output dial 654, the self-synchronous transmitter 656, and through it the self-synchronous receiver and dial 657, and the Q switches, through shafts 658, 659, and 661, respectively, these dials thus indicating the angular displacement of the motor shaft and therefore the frequency tracker output data.

*Position servomechanism amplifier*

Referring now to Fig. 10, the error signal from relay contacts 509D is conducted through a conductor 662 (Figs. 6 and 10), through a coupling condenser 663 to the grid 664 of a triode 666. The amplified alternating-current error signal is applied to a transformer 667 which applies the signal to a differential stage comprising tubes 668 and 669, the transformer secondary being bridged by a by-passed center-tapped resistor 671. The differential stage output therefore is in push-pull, the phase being dependent upon the phase of the error signal applied through conductor 662. The differential stage is made to detect phase by applying 400-cycle voltage to the plates, the sense of the plate current difference then depending on the phase of the input relative to the plate power supply phase.

In series with each plate 672 and 673 there is connected the control windings 674 and 676 of a saturable transformer, each control winding being by-passed by a condenser and resistor, 677, 678, 679, and 681, to improve the speed of response. The transformer primary windings 682 and 683 are connected in series with a 400-cycle source and the secondary windings 684 and 686 are connected in series between ground and an output conductor 687. It is therefore obvious that the magnitude and phase of the output in conductor 687 represent the magnitude and phase sense of the input error signal in conductor 662.

The output conductor 687 is connected through relay contacts 508D to one winding 688 of the two-phase motor 652, the winding 688 being shunted by a condenser 689 while the second winding 691 is connected to the source of 400-cycle power.

A high degree of linearity is secured by the expedient of employing a fraction of the saturable transformer output voltage at conductor 687 fed back negatively to the input of transformer 667. A blocking condenser 692 blocks the passage of the direct-current plate voltage to ground while having low reactance for 400-cycle voltage. The output voltage at conductor 687 is led through feedback conductor 693 to a resistor 694 and condenser 692 in series to ground, so that the intermediate junction 696 has a small fraction of the output voltage. The primary winding 697 of transformer 667 has a high reactance compared to that of the condenser 692, so that the phase of the input signal from tube 666 at the junction 696 is nearly opposite to that at the plate terminal 698. The connections of the saturable transformers are so arranged that the fed back voltage applied to the terminal 696 is in phase with that applied by the input signal at terminal 698, resulting in the negative feedback condition at terminal 696.

The correction timer 32, Fig. 6, is identical with that described in connection with Fig. 2A and has the same time cycle. It operates relay 506 for two seconds, followed by a release period of 20 seconds. The relay contacts 506A upon closing at the beginning of the two-second period operate relay 507. This relay has two sets of contacts 507A and 507B, which when normal connect the discriminator servo system in the circuit previously described and as depicted in Fig. 6, the input terminal 11 being connected to the mixer-modulator 13 and the discriminator 16 being connected to the main integrator 511. However, when the relay 506 is operated the contacts 507A and 507B are operated thereby. Contact 507A disconnects the input terminal 11 and connects the output conductor 699 of the tone generator 34 to the input terminal of the mixer-modulator. Contact 507B disconnects the main integrator and substitutes a correction integrator 701.

*Correction integrator*

Referring now to Fig. 11, the correction integrator is similar to the main integrator, Fig. 7, the only difference being in the omission of the final cathode follower stage. The correction integrator comprises a differential direct-coupled stage having two tubes 702 and 703, with input through conductor 704 to grid 706. Output from anode terminal 707 is connected to the final triode amplifier 708, from the anode terminal 709 of which the output conductor 711 is taken. The Miller feedback condenser 712 is connected between input 704 and output 711, producing the integrating effect. The amplifier is stabilized by use of a triode 713 and two sets of relay contacts 505C and 505D actuated by relay 505 (Fig. 7).

Referring again to Fig. 6, the output conductor 711 of the correction integrator 701 is connected through a resistor 714 to junction 716, where it is connected to resistor 512. The potential of the junction 716 is representative of the sum of the output potentials of the main integrator 511 and the correction integrator 701 and since each of these potentials remains constant when the integrator input is cut off, the potential at junction 716 represents this sum continuously, even though the two integrators are connected into circuit alternately.

The correction integrator, when connected into the circuit for the two-second correction interval, completes a correction servo system loop having as the principal components the mixer-modulator 13, the AGC amplifier 389, the discriminator 16, the correction integrator 701 and the local oscillator 14. The input to the main integrator 511 has been opened at the relay contacts 507B, therefore its output voltage at conductor 529 and supplied to the subtraction circuit 534 through conductor 543 remains constant. This results in the frequency of the output voltage of the tone wheel supplied through conductor 699 to the mixer-modulator 13 remaining constant and this tone wheel frequency is the reference frequency or criterion for correction under this condition. At the start of the correction period the correction integrator 701 may be supplied with a small error potential which causes its output voltage to change slightly, changing the frequency of the local oscillator 14 until the error signal emitted by the discriminator 16 has become zero. This correction integrator output potential remains constant during the ensuing 20-second operating period, supplying a constant correction through the resistor 714 in the form of a contribution to the direct-current voltage supplied through conductor 717 to control the local oscillator 14.

The operation of the automatic signal frequency tracker when the input signals fail and the instrument exercises its memory function is as follows. Reduction of input signal below the selected minimum causes relay 501 to release as stated before, and relay 502 to operate, causing the operation of relays 508 and 509. The application of positive battery potential through contacts 502A causes the main integrator to sweep the local oscillator frequency from 36 kc. to 21 kc. as described in connection with Figs. 2A and 5. At about 21 kc. the sweep limiter 397 is actuated. Its construction is identical with that of the same-numbered sweep limiter of Fig. 2A and its operation is as before described, operating relay 503 to apply overriding negative battery to the main integrator, returning the local oscillator to 36 kc. to recommence its sweep.

Operation of relay 509 opens the direct-current input conductor 543 to the subtraction circuit 534 by means of contacts 509C, Fig. 8, and connects the control grid 559 of tube 557 to grid 548 of tube 549 so that the D.-C. biases are equalized, thus producing a condition representative of a D.-C. input signal at its zero datum level. The relay contact 509B is operated so that the armature goes to its upper portion, decreasing negative feedback on tube 553. The relay contact 509A (Fig. 6) is operated, opening the direct feedback connection from the output generator 28 to the subtraction circuit and connecting the subtraction circuit input through conductor 718 and operated contacts 509D to the slider 648 of voltage divider 646. Operation of the relay contacts 509D opens the input of the position servoamplifier 651 and operation of the relay contact 508D opens the output connection thereof to the motor 652. This action immobilizes the slider 648. These several relay operations open both the rate servomechanism loop and the position servomechanism loop and combine them to form a new servomechanism loop that may be termed the memory servomechanism loop. It contains as components, the motor 27, generator 28, amplifier 642, voltage divider 646, subtraction circuit 534, and rate servoamplifier 26. The subtraction circuit 534 does not subtract but merely amplifies. The voltage divider 646 compares by subtraction the feedback signal applied to terminal 644 with a criterion signal represented by the fixed position of the slider 648. Servoing action takes place if necessary until the changing feedback signal applied to terminal 644 causes sufficient error voltage to be produced at the slider 648 to maintain the speed of motor 27 at the constant rate representing the servo null for the set position of slider 648. At this speed a constant output voltage is maintained at output conductor 538 representing a remembered value of output data. The readings of dials 654 and 657 have substantially the same value and are unchanging during periods of input signal failure because they are geared to the shaft of the open-circuited motor 652.

What is claimed is:

1. An automatic signal frequency tracker comprising, a local oscillator adjustable over a frequency range, mixer means having impressed thereon an input signal the frequency of which randomly varies over a range of frequencies and the output signal of said local oscillator producing therefrom a beat frequency signal, fixed frequency discriminator means having said beat frequency signal impressed thereon and producing therefrom an output signal on departure of said beat frequency signal from the fixed frequency of said discriminator means, first circuit means operative in accordance with said discriminator output signal for adjusting the frequency of said local oscillator, a motor, a generator operated thereby, said generator producing an output signal the amplitude of which is proportional to the speed of said motor, second circuit means operated by said discriminator output for readjusting the speed of said motor, detector means producing an output signal the amplitude of which is dependent on the ratio of input signal to noise, and means operative by the decrease of the output signal of said detector means below a preselected value for interrupting the operation of said second circuit means and for maintaining said motor speed at its last adjustment.

2. An automatic signal frequency tracker comprising, a local oscillator adjustable over a frequency range, mixer means having impressed thereon an input signal the frequency of which randomly varies over a range of frequences and the output signal of said local oscillator producing therefrom a beat frequency signal, fixed frequency discriminator means having said beat frequency signal impressed thereon and producing therefrom an output signal on departure of said beat frequency signal from the fixed frequency of said discriminator means, first circuit means operative in accordance with said discriminator output signal for adjusting the frequency of said local oscillator, a motor, a generator operated thereby, said generator producing an output signal the amplitude of which is proportional to the speed of said motor, second circuit means operated by said discriminator output for readjusting the speed of said motor, detector means producing an output signal, the amplitude of which is dependent on the ratio of input signal to noise, means operative by the decrease of the output signal of said detector means below a preselected value for interrupting the operation of said second circuit means and for maintaining said motor speed at its last adjustment, and means including the means operative by the output signal of the detector means for applying a continuously varying signal to said local oscillator to cause it to be continuously adjusted over its entire range.

3. An automatic signal frequency tracker comprising, a local oscillator adjustable over a frequency range, mixer means having impressed thereon an input signal the frequency of which randomly varies over a range of frequencies and the output of said local oscillator producing therefrom a beat frequency signal, fixed frequency discriminator means having said beat frequency signal impressed thereon and producing therefrom an output signal on departure of said beat frequency signal from the fixed frequency of said discriminator means, circuit means operative in accordance with said discriminator output signal for adjusting the frequency of said local oscillator, a motor, a constant frequency variable amplitude generator operated thereby, a rate servo circuit including said motor and said generator for controlling the output amplitude of said generator in accordance with an input potential applied to said rate servo circuit, circuit means operative by said discriminator output signal for readjusting the input potential applied to said rate servo circuit, detector means producing an output signal the amplitude of which is dependent on the ratio of input signal to noise, and means operative by the decrease in amplitude of the output signal of said detector below a preselected level for interrupting the circuit means which readjusts the input potential applied to said rate servo circuit whereby the input potential of said rate servo circuit is maintained at its last previously adjusted level.

4. An automatic signal frequency tracker comprising, a local oscillator adjustable over a frequency range, mixer means having impressed thereon an input signal the frequency of which randomly varies over a range of frequencies and the output of said local oscillator producing therefrom a beat frequency signal, fixed frequency disciminator means having said beat frequency signal impressed thereon and producing therefrom an output signal on departure of said beat frequency signal from the fixed frequency of said discriminator means, circuit means operative in accordance with said discriminator output signal for adjusting the frequency of said local oscillator, a motor, a constant frequency variable amplitude generator operated thereby, a rate servo circuit including said motor and said generator for controlling the output amplitude of said generator in accordance with an input potential applied to said rate servo circuit, circuit means operative by said discriminator output signal for readjusting the input potential applied to said rate servo circuit, detector means producing an output signal the amplitude of which is dependent on the ratio of input signal to noise, means operative by the decrease in amplitude of said detector output signal below a preselected level for interrupting the circuit means which readjusts the input potential applied to said rate servo circuit whereby said input potential is maintained at its last adjusted amplitude, and means including said means operative by said detector output signal for applying a continuously varying signal to said local oscillator whereby said oscillator is caused to be continuously varied throughout its range.

5. An automatic signal frequency tracker comprising, a local oscillator adjustable over a frequency range, mixer means connected to said local oscillator output and being provided with a signal input circuit for producing a beat frequency signal from the signal generated by said local oscillator and a signal impressed on said signal input circuit, fixed frequency discriminator means having said beat frequency signal impressed thereon and producing therefrom an output signal on departure of said beat frequency signal from a selected fixed frequency, primary control means the output of which is readjusted by the application of said discriminator means output signal thereto, secondary control means the output of which is readjusted by the application of said discriminator means output signal thereto, a summation circuit means having said primary and secondary control means outputs applied thereto, circuit means for applying a signal produced by said summation circuit means on said local oscillator for adjusting the signal frequency thereof, a motor, motor circuit means connected thereto for operating said motor at a speed dependent on the value of a control signal applied thereto, a constant frequency variable amplitude generator mechanically connected to said motor the output amplitude of which depends on the speed of said motor, a variable frequency generator mechanically connected to said motor producing a signal output the frequency of which depends on the speed of said motor, means interconnecting said summation circuit means and said motor circuit means for readjusting the value of said control signal in accordance with a signal produced by said summation circuit means, switching means for connecting the signal input circuit of said mixer means to a source of signal energy whose frequency randomly varies over a range and said discriminator means output to said primary control means for a selected interval of time and alternately connecting the signal input circuit of said mixer means to the output of said variable frequency generator and said discriminator means output to said secondary control means for another selected interval of time.

6. An automatic signal frequency tracker as set forth in claim 5 additionally including detector means producing an output signal the amplitude of which is dependent on the ratio of the signal energy whose frequency randomly varies to noise energy, and means operative by decrease in amplitude of the output signal of said detector means below a preselected level for preventing readjustment of said control signal in accordance with the signal produced by the summation circuit means.

7. An automatic signal frequency tracker as set forth in claim 6 additionally including means operative by decrease of said detector output signal below said preselected level for applying a continuously varying signal to said local oscillator whereby the frequency of said local oscillator is continuously varied throughout its range.

8. An automatic signal frequency tracker comprising, a local oscillator adjustable over a frequency range, mixer means connected to said local oscillator output provided with a signal input circuit for producing a beat frequency signal from the signal generated by said local oscillator and a signal impressed on said signal input circuit, fixed frequency discriminator means having said beat frequency signal impressed thereon and producing therefrom an output signal on departure of said beat frequency signal from a selected fixed frequency, primary control means the output of which is readjusted by the application of said discriminator means output signal thereto, secondary control means the output of which is readjusted by the application of said discriminator means output signal thereto, a summation circuit means having said primary and secondary control means outputs applied thereto, circuit means for applying a signal produced by said summation circuit means to said local oscillator for adjusting the signal frequency thereof, a motor, motor circuit means connected thereto for operating said motor at a speed dependent on the value of a control signal applied thereto, a constant frequency variable amplitude generator operated by said motor to produce an output the amplitude of which depends on the speed of said motor, a variable frequency generator operated by said motor to produce an output the frequency of which depends on the speed of said motor, means interconnecting said summation circuit means and said motor circuit means for readjusting the value of said control signal in accordance with a signal produced by said summation circuit means, switching means for connecting the signal input circuit of said mixer means to a source of signal energy whose frequency randomly varies over a range and said discriminator means output to said primary control means for a selected interval of time and alternately connecting the signal input circuit of said mixer means to the output of said variable frequency generator and said discriminator means output to said secondary control means for another selected interval of time, and means for preventing readjustment of said control signal by the signal produced by said summation circuit during the interval of time that the discriminator means output is connected to said secondary control means.

9. An automatic signal frequency tracker as set forth in claim 8 additionally including detector means producing an output signal the amplitude of which is dependent on the ratio of the signal energy whose frequency randomly varies to noise energy, and means operative by decrease in amplitude of detector means output signal below a preselected level for preventing readjustment of the value of said control signal in accordance with the signal produced by the summation circuit means.

10. An automatic signal frequency tracker as set forth in claim 9 additionally including means operative by decrease of said detector output signal below said preselected level for applying a continuously varying signal to said local oscillator whereby the frequency of said local oscillator is continuously varied throughout its range.

11. An automatic signal frequency tracker comprising, a local oscillator adjustable over a frequency range, mixer means connected to said local oscillator output provided with a signal input circuit for producing a beat frequency signal from the signal generated by said local oscillator and a signal impressed on said signal input circuit, fixed frequency discriminator means having said beat frequency signal impressed thereon and producing therefrom an output signal on departure of said beat frequency signal from a selected fixed frequency, main integrating control means producing an output signal whose amplitude is the integral of the signal energy applied to the input thereof, correction integrating means producing an output signal whose amplitude is the integral of the signal energy applied to the input thereof, a series resistance bridge connected between the output terminals of said main integrating means and said correction integrating means, a circuit connecting the midterminal of said resistance bridge to the input of said local oscillator for applying a signal to said local oscillator to adjust the frequency of oscillations thereof, a motor, motor circuit means connected thereto for operating said motor at a speed dependent on the value of a control signal applied thereto, a constant frequency variable amplitude generator operated by said motor to produce an output the amplitude of which depends on the speed of said motor, a variable frequency generator operated by said motor to produce an output the frequency of which depends on the speed of said motor, circuit means for applying said control signal to said motor control circuit connected between the main integrating means terminal of said resistance bridge and said motor control circuit, switching means for connecting the signal input circuit of said mixer means to a source of a signal energy whose frequency randomly varies over a range of frequencies and said discriminator output to said main integrating means for a selected interval of time and alternately connecting the signal input circuit of said mixer means to the output of said variable frequency generator and said discriminator output to said correction integrating means for another selected interval of time.

12. An automatic signal frequency tracker as set forth in claim 11 additionally including detector means producing an output signal the amplitude of which is dependent on the ratio of the signal energy whose frequency randomly varies to noise energy, and means operative by decrease in amplitude of detector means output signal below a preselected level for interrupting the circuit connected between said resistance bridge and said motor control circuit and for applying a signal to said motor control circuit which is representative of the last previous adjustment thereto.

13. An automatic signal frequency tracker as set forth in claim 12 additionally including means operative by decrease of said detector output signal below said preselected level for applying a continuously varying signal to said local oscillator whereby the signal frequency thereof is continuously varied throughout the range of said local oscillator.

14. An automatic signal frequency tracker comprising, a local oscillator adjustable over a frequency range, mixer means connected to said local oscillator output provided with a signal input circuit for producing a beat frequency signal from the signal generated by said local oscillator and a signal impressed on said signal input circuit, fixed frequency discriminator means having said beat frequency signal impressed thereon and producing therefrom an output signal at such times as said beat frequency signal departs from a fixed frequency, main intergrating control means producing an output signal whose amplitude is the time integral of the signal amplitude applied to the input thereof, corrective integrating control means producing an output signal whose amplitude is the time integral of the signal amplitude applied to the input thereof, a resistance bridge having its opposite ends connected respectively to the output terminals of said main integrating control means and said corrective integrating control means, a circuit connecting an intermediate terminal of said resistance bridge to the input of said local oscillator for applying a signal thereto to adjust the frequency of oscillations thereof, a motor, a variable amplitude output generator operated by said motor to produce an output signal the amplitude of which is dependent on the speed of said motor, a rate servo system including said motor and said generator and a subtraction circuit connected in a closed loop to control the speed of said motor in accordance with the value of a control signal imposed on said subtraction circuit, a circuit interconnecting the terminal of said resistance bridge connected to said main integrating control means output terminal and said subtraction circuit for applying a control signal thereto, a variable frequency generator operated by said motor to produce an output the frequency of which depends on the speed of said motor, switching means alternately operative during successive selected intervals of time for connecting the signal input circuit of said mixer means to a source of input signal of randomly varying frequency and the output of said discriminator means to said main integrating control means during one of said time intervals and connecting the input of said mixer means to the output of said variable frequency generator and the output of said mixer means to said corrective control means during the other of said time interval.

15. An automatic signal frequency tracker as set forth in claim 14 additionally including detector means producing an output signal the amplitude of which is dependent on the ratio of said randomly varying signal energy to noise energy, and means operative by decrease in output signal of said detector means below a preselected level for interrupting the circuit interconnecting said subtraction circuit and said resistance bridge and for applying a signal thereto which is solely a function of the amplitude of said variable amplitude output generator at the time of decrease in detector output signal below said preselected level.

16. An automatic signal frequency tracker as set forth in claim 15 additionally including means operative by decrease in said detector output below said preselected level for causing said local oscillator to be continuously varied throughout its frequency range.

17. An automatic signal frequency tracker as set forth in claim 14 additionally including auxiliary circuit means for producing a second control signal, means including said auxiliary circuit means for adjusting said second control signal amplitude to equal the amplitude of said variable amplitude output generator, detector means producing an output signal the amplitude of which is dependent on the ratio of said randomly varying signal energy to noise energy, means operative by decrease in output signal of said detector means below a preselected level for interrupting the imposition of said first mentioned control signal on said subtraction circuit, interrupting the adjustment of said second control signal and imposing said second control signal on said subtraction circuit.

References Cited in the file of this patent

UNITED STATES PATENTS

| | | |
|---|---|---|
| 2,283,523 | White | May 19, 1942 |
| 2,399,421 | Artzt | Apr. 30, 1946 |
| 2,448,564 | Wilkerson | Sept. 7, 1948 |
| 2,486,551 | Boothroyd | Nov. 1, 1949 |
| 2,512,665 | Meredith | June 27, 1950 |
| 2,513,786 | Crosby | July 4, 1950 |
| 2,516,308 | Forrester | July 25, 1950 |
| 2,523,537 | Mayer | Sept. 26, 1950 |
| 2,537,596 | Martinelli | June 9, 1951 |